(12) United States Patent
Abe et al.

(10) Patent No.: US 9,927,894 B2
(45) Date of Patent: Mar. 27, 2018

(54) DISPLAY DEVICE HAVING COUNTER ELECTRODES CONFIGURED TO USE AS COMMON ELECTRODES AND SCAN ELECTRODES

(71) Applicant: Japan Display Inc., Tokyo (JP)

(72) Inventors: Hiroyuki Abe, Tokyo (JP); Takayuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 359 days.

(21) Appl. No.: 14/732,933

(22) Filed: Jun. 8, 2015

(65) Prior Publication Data

US 2015/0355767 A1    Dec. 10, 2015

(30) Foreign Application Priority Data

Jun. 9, 2014 (JP) ................................. 2014-118647

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/0412; G06F 3/0416; G06F 3/044
See application file for complete search history.

(56) References Cited

U.S. PATENT DOCUMENTS

| | | | |
|---|---|---|---|
| 2011/0169788 A1 | 7/2011 | Abe et al. | |
| 2012/0050217 A1* | 3/2012 | Noguchi | G06F 3/0412 345/174 |
| 2012/0068961 A1* | 3/2012 | Mizuhashi | G06F 3/0412 345/174 |
| 2012/0262387 A1 | 10/2012 | Mizuhashi et al. | |
| 2012/0306844 A1 | 12/2012 | Abe et al. | |
| 2013/0088483 A1 | 4/2013 | Abe et al. | |
| 2014/0152644 A1 | 6/2014 | Abe et al. | |
| 2014/0168161 A1* | 6/2014 | Sugita | G06F 3/044 345/174 |
| 2014/0320427 A1* | 10/2014 | Lee | G06F 3/0416 345/173 |
| 2014/0375606 A1 | 12/2014 | Abe et al. | |

(Continued)

FOREIGN PATENT DOCUMENTS

JP    2012-230657 A    11/2012

*Primary Examiner* — Temesghen Ghebretinsae
*Assistant Examiner* — Ivelisse Martinez Quiles
(74) *Attorney, Agent, or Firm* — Typha IP LLC

(57) ABSTRACT

A display device comprises counter electrodes configured to be used as common electrodes for displaying and scan electrodes for touch sensing, a first scan circuit which scans gate lines, and a second scan circuit which scans the counter electrodes. In the display device, one frame period includes a write period for continuously scanning one screen and a touch sensing period existing between the write period and a write period in the next frame. The second scan circuit includes a shift register unit and a switch unit. The switch unit includes a seventh thin-film transistor which outputs a DC drive signal to an output node and an eighth thin-film transistor which outputs an AC drive signal to the output node. A second control signal for fixing the voltage of a third retention node to which the gate electrode of the seventh thin-film transistor is connected is inputted in the write period.

11 Claims, 18 Drawing Sheets

(56) References Cited

U.S. PATENT DOCUMENTS

2015/0084920 A1* 3/2015 Abe .................. G06F 3/044
 345/174
2015/0161954 A1* 6/2015 Tokita ................ G06F 3/0412
 345/174

* cited by examiner

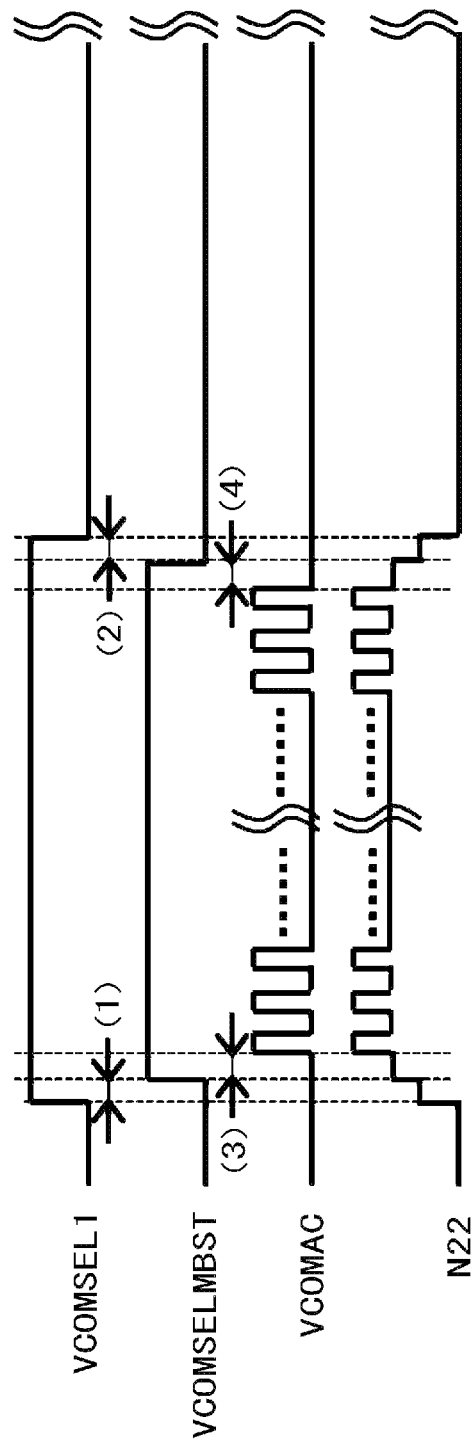

DISPLAY DEVICE HAVING COUNTER ELECTRODES CONFIGURED TO USE AS COMMON ELECTRODES AND SCAN ELECTRODES

CLAIM OF PRIORITY

The present application claims priority from Japanese patent application JP2014-118647 filed on Jun. 9, 2014, the content of which is hereby incorporated by reference into this application.

BACKGROUND

The present disclosure relates to a display device. The present disclosure is applicable to display devices having a touch panel of the in-cell type, for example.

JP-2012-230657-A (hereinafter referred to as "Patent Literature 1") and U.S. Patent Application Publication No. 2012/262387 (hereinafter referred to as "Patent Literature 2") corresponding to the Patent Literature 1 have disclosed the following technologies: In a technology described in an embodiment, a touch sensing period (Pt) for performing a touch sensing operation and a write period (Pw) for performing the writing of pixel signals (Vpix) for the display operation are arranged in each horizontal period (1H). In a technology described in a modified example, 20 touch sensing periods (Pt) and 20 display periods (Pd) are alternately arranged in one frame period (1F).

SUMMARY

In the touch panel of the in-cell type described in the Patent Literature 1 or 2, the common electrodes for the displaying are used also as the scan electrodes for the touch panel (shared use of the same electrodes), and thus the shared electrodes are used in the time-sharing manner. In other words, the pixel writing and the touch sensing cannot be performed at the same time. Therefore, adjustment of the write periods (gate line scan periods) and the touch sensing periods (common line scan periods) is necessary.

The other objects and new features will become apparent from the description of the present disclosure and the accompanying drawings.

The outline of a typical configuration in the present disclosure can be described briefly as follows:

A display device comprises counter electrodes which are configured to be used as both common electrodes for displaying and scan electrodes for touch sensing, a first scan circuit which scans gate lines, and a second scan circuit which drives the counter electrodes. The display device is configured so that one frame period includes at least one write period for scanning the gate lines and at least one touch sensing period for scanning the touch sensing scan electrodes. The display device has a first mode in which the write period and the touch sensing period appear alternately multiple times in one frame period and a second mode in which one frame period includes a write period for continuously scanning one screen and a touch sensing period existing between the one-screen write period and a one-screen write period in the next frame. The second scan circuit includes a shift register unit and a switch unit. The first and second scan circuits include single-channel thin-film transistors. The switch unit includes a seventh thin-film transistor which outputs a DC drive signal to an output node and an eighth thin-film transistor which outputs an AC drive signal to the output node. A second control signal for fixing the voltage of a third retention node to which the gate electrode of the seventh thin-film transistor is connected is inputted in the one-screen write period of the second mode.

BRIEF DESCRIPTION OF THE DRAWINGS

FIG. 23 is a timing chart of the switch unit of the common scan circuit of the display device according to the example.

DESCRIPTION OF THE PREFERRED EMBODIMENTS

Figure 1:
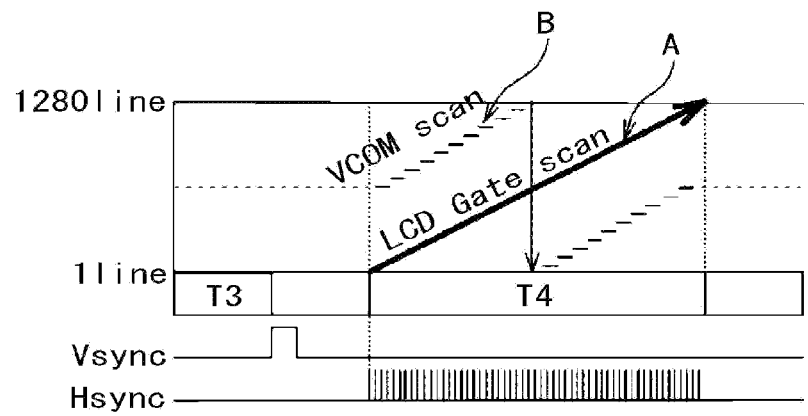
FIG. 1 is a schematic diagram for explaining write periods and touch sensing periods according to a method of a comparative example.

Referring now to the drawings, a description will be given in detail of a preferred embodiment. Incidentally, the present disclosure is given just as an instance for illustration, and modifications that can easily be conceived of by those skilled in the art without departing from the content of the present invention should naturally be contained in the scope of the present invention. While the drawings can indicate the width, thickness, shape, etc. of each part rather schematically compared to the actual mode of implementation for the sake of clarifying the explanation, the drawings are just examples for illustration and should not limit the interpretation of the present invention. In the description and drawings, elements equivalent to those already explained with reference to an aforementioned drawing are assigned the already-used reference characters and detailed explanation thereof can be omitted properly.

As mentioned above, the pixel writing and the touch sensing cannot be performed at the same time in touch panels of the in-cell type since the common electrodes for the displaying are used also as the touch panel scan electrodes (shared use of the same electrodes) in the in-cell type touch panels. The shared electrodes have to be used in a time-sharing manner. Thus, adjustment of the write periods (gate line scan periods) and the touch sensing periods (common line scan periods) is necessary. Further, noise has to be prevented in a wide frequency range. Methods for adjusting the write periods and the touch sensing periods will be explained below.

Method of Comparative Example

First, a technology that was examined prior to the present disclosure (hereinafter referred to as a "comparative example") will be explained below by referring to FIGS. 1 and 2.

Figure 2:
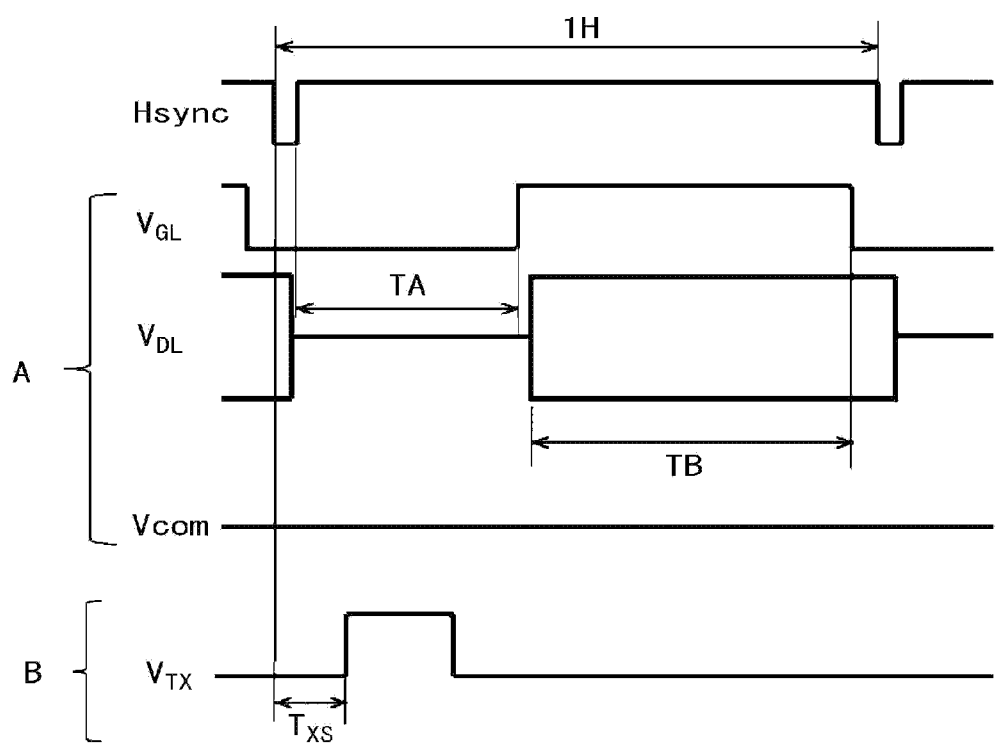
FIG. 2 is a schematic diagram for explaining the write periods and the touch sensing periods according to the method of the comparative example.

FIGS. 1 and 2 are schematic diagram for explaining the write periods and the touch sensing periods according to the method of the comparative example.

In a gate scan operation A (LCD Gate scan), the writing of pixels from the 1st display line to the 1280th display line is performed in one frame of pixel write period (T4). In a common scan operation B (VCOM scan), touch panel sensing is performed at common electrodes in each of blocks (e.g., 20 blocks defined by partitioning the screen). In FIG. 1, the reference character T3 represents a flyback period, Vsync represents a vertical synchronizing signal, and Hsync represents a horizontal synchronizing signal.

As shown in FIG. 1, the common scan operation B for the touch sensing (touch sensing operation B) in which the common electrodes of specified display lines function as touch panel scan electrodes (scan electrodes for the touch panel) is performed at a position different from that of the gate scan operation (display operation) A for the pixel writing. Since the common electrodes have to be operated also as the touch panel scan electrodes, the display operation A and the touch position sensing operation B using the same common electrodes are performed in a totally time-sharing manner under synchronization control.

As shown in FIG. 2, in the method of the comparative example, the display operation A (pixel writing) and the touch sensing operation B (driving of touch panel scan voltage ($V_{TX}$)) are performed in one horizontal period (1H).

While the gate scan operation A and the common scan operation B are performed at different display lines, there exists parasitic capacitance between the video lines and the common electrodes and between the gate lines and the common electrodes and the sensitivity of the touch sensing is deteriorated by the fluctuation in the video signal ($V_{DL}$) in the video lines and/or noise occurring at times of rise or fall of the scan voltage ($V_{GL}$) in the gate lines. Incidentally, the method of the comparative example employs the column inversion as the method of AC driving, and thus the common voltage (Vcom) which is supplied to the common electrodes is at a constant electrical potential.

Therefore, the touch sensing operation B in the method of the comparative example is performed in periods free from the fluctuation in the video signal ($V_{DL}$) or the rise/fall of the scan voltage ($V_{GL}$) (a first period TA and a second period TB shown in FIG. 2).

Further, the method of the comparative example takes a countermeasure against exogenous noise such as noise from a charger (so-called AC charger noise) when supplying the touch panel scan voltage ($V_{TX}$) to the same scan electrodes a plurality of times (e.g., 32 times) across a plurality of horizontal scan periods, by delaying the timing of supplying the touch panel scan voltage ($V_{TX}$) to the scan electrodes in each horizontal scan period by a unit delay time (stored in a register) with reference to a touch panel scan start wait time (Txs). Incidentally, the touch panel scan start wait time (Txs) with reference to the fall of the horizontal synchronizing signal (Hsync) is set with a safety margin so as to avoid the fluctuation in the video signal ($V_{DL}$) in the video lines.

However, in the method of the comparative example, the touch panel scan voltage ($V_{TX}$) cannot be supplied to the scan electrodes between the end of the first period TA and the start of the second period TB or between the end of the second period TB and the start of the first period TA. Since the touch panel scan voltage ($V_{TX}$) has to be supplied while securing a safety margin with respect to the start and the end of the first period TA and the start and the end of the second period TB, the control of the timing of supplying the touch panel scan voltage ($V_{TX}$) is difficult in this method of the comparative example.

First Method

The write periods and the touch sensing periods according to a first method will be explained below by referring to FIGS. 3 and 4.

Figure 3:
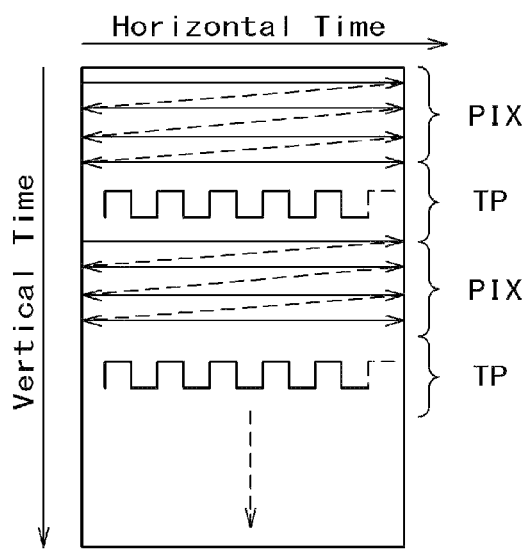
FIG. 3 is a schematic diagram for explaining the write periods and the touch sensing periods according to a first method.
Figure 4:
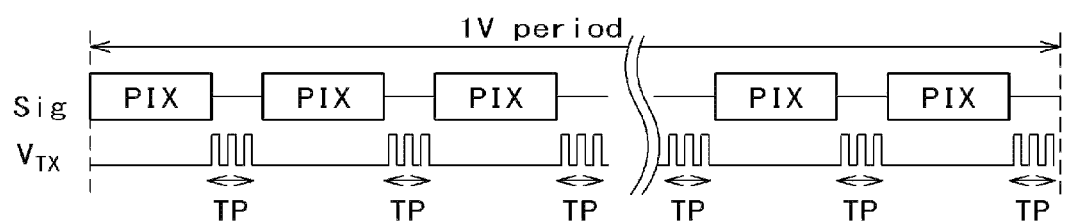
FIG. 4 is a schematic diagram for explaining the write periods and the touch sensing periods according to the first method.

FIGS. 3 and 4 are schematic diagrams for explaining the write periods and the touch sensing periods according to the first method.

In the first method, one vertical period (1V period) or the display period of one frame is segmented into the write periods (PIXs) (periods for driving the video signals and the scan signals (Sig)) and the touch sensing periods (TPs) (periods for driving the touch panel scan voltage ($V_{TX}$)) which are arranged alternately. This alternate driving is called "segmented V blank driving". The display period of one frame includes N write periods (PIXs) and N touch sensing periods (TPs). For example, 1280/N lines are scanned in each write period (PIX) and 20/M scan electrodes (common electrodes) are scanned in each touch sensing period (TP). In a case where N=20 and M=20, for example, 64 lines are scanned in each write period (PIX) and one scan electrode is scanned in each touch sensing period (TP). The touch panel scan voltage ($V_{TX}$) is applied to each scan electrode 20-40 times. Here, M is a natural number. The number M can be greater or less than N or equal to N. When the number of times of the touch sensing in each vertical period should be set large (e.g., 4 times), the numbers N and M can be set at 20 and 5 (N=20, M=5). This setting allows every common electrode to perform the touch sensing four times in each vertical period, by which the accuracy of the touch sensing is increased. When the number of times of the touch sensing in each vertical period should be set small (e.g., ½ times per vertical period, that is, once in two vertical periods), the numbers N and M can be set at 20 and 40 (N=20, M=40). With this setting, every common electrode performs the touch sensing once in two vertical periods, by which the power consumption for the touch sensing is reduced. The values of N and M are determined by setting values in a storage circuit (e.g., register) of a driver IC (explained later) from a host controller.

Since the common electrodes for the displaying have to function also as the scan electrodes for the touch sensing, the common scan operation for the touch panel sensing is performed in periods in which the gate scan operation for the pixel writing is not performed as shown in FIGS. 3 and 4. In other words, the write periods (PIXs) and the touch sensing periods (TPs) are separated from each other. Thus, it is easy to perform the touch sensing operation in periods free from the fluctuation in the voltage ($V_{DL}$) in the video signal lines or the rise/fall of the voltage ($V_{GL}$) in the scan signal lines. Further, since the supply of the touch panel scan voltage ($V_{TX}$) is possible except at the start and the end of the touch sensing period (TP), the shifting of the timing of supplying the touch panel scan voltage ($V_{TX}$) to the scan electrodes (as the countermeasure against the exogenous noise such as the AC charger noise) is easier in this method than in the method of the comparative example.

Second Method

The write periods and the touch sensing periods according to a second method will be explained below by referring to FIG. 5.

Figure 5:
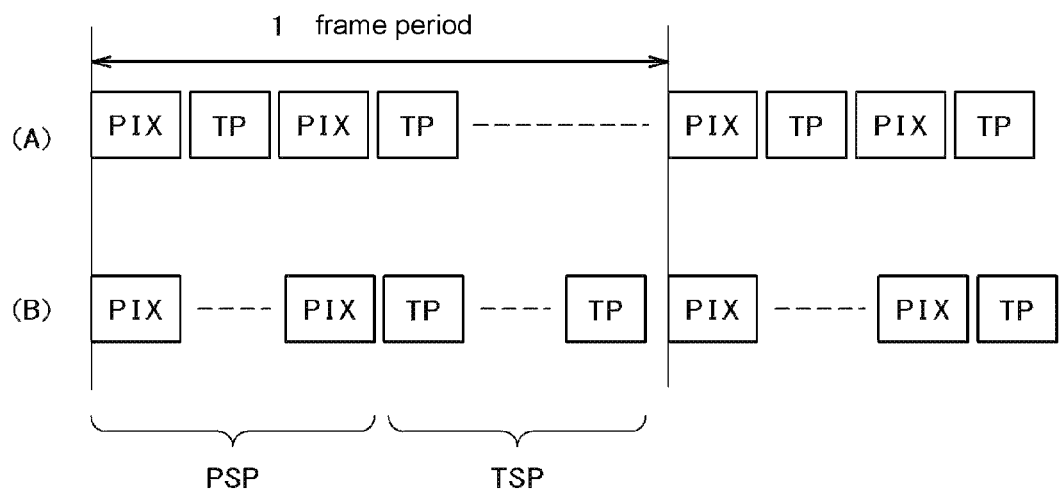
FIG. 5 is a schematic diagram for explaining the write periods and the touch sensing periods according to a second method.

FIG. 5 is a schematic diagram for explaining the write periods and the touch sensing periods according to the second method. FIG. 5(A) shows the write periods and the touch sensing periods according to the first method and FIG. 5(B) shows the write periods and the touch sensing periods according to the second method.

In the second method, one vertical period or the display period of one frame (1 frame period) is segmented into two periods: a period for driving the video signals and the scan signals (write period (PSP)) and a period for driving the touch panel scan voltage ($V_{TX}$) (touch sensing period (TSP)). In other words, one frame period includes only one period (PSP) for driving the video signals and the scan signals and only one period (TSP) for driving the touch panel scan voltage ($V_{TX}$). The write period (PSP) includes N consecutive write periods (PIXs), while the touch sensing period (TSP) includes M consecutive touch sensing periods (TPs). Similarly to the first method, 1280/N lines are scanned in each write period (PIX) and 20/M scan electrodes (common electrodes) are scanned in each touch sensing period (TP), for example. In a case where N=20 and M=20, for example, 64 lines are scanned in each write period (PIX) and one scan electrode is scanned in each touch sensing period (TP). Therefore, 1280 lines are scanned in the write period (PSP) and 20 scan electrodes are scanned in the touch sensing period (TSP). The touch panel scan voltage ($V_{TX}$) is applied to each scan electrode 20-40 times. Here, M is a natural number. The number M can be greater or less than N or equal to N. When the number of times of the touch sensing in each vertical period should be set large (e.g., 4 times), the numbers N and M can be set at 20 and 5 (N=20, M=5). This setting allows every common electrode to perform the touch sensing four times in each vertical period, by which the accuracy of the touch sensing is increased. When the number of times of the touch sensing in each vertical period should be set small (e.g., ½ times per vertical period, that is, once in two vertical periods), the numbers N and M can be set at 20 and 40 (N=20, M=40). With this setting, every common electrode performs the touch sensing once in two vertical periods, by which the power consumption for the touch sensing is reduced. The values of N and M are determined by setting values in a storage circuit (e.g., register) of the driver IC (explained later) from the host controller.

In the second method, the write period (PSP) and the touch sensing period (TSP) are totally separated from each other, and thus it is easy to perform the touch position sensing operation in periods free from the fluctuation in the voltage ($V_{DL}$) in the video signal lines or the rise/fall of the voltage ($V_{GL}$) in the scan signal lines. Further, since the continuous touch sensing period (TSP) is longer than the aforementioned touch sensing period (TP) in the first method, the shifting of the timing of supplying the touch panel scan voltage ($V_{TX}$) to the scan electrodes (as the countermeasure against the exogenous noise such as the AC charger noise) is easier in this second method than in the first method.

Embodiment

A display device according to an embodiment of the present disclosure is configured to be able to operate either in the first method (first mode) or in the second method (second mode). As the countermeasure against the exogenous noise such as the AC charger noise, the shifting of the timing of supplying the touch panel scan voltage ($V_{TX}$) to the scan electrodes can be conducted with ease. The selection between the first method and the second method is made by setting a value in a storage circuit (e.g., register) of the driver IC from the host controller.

The interval between a write period and the next write period and the interval between a touch sensing period and the next touch sensing period in the second method are longer than those in the first method. The long intervals can have ill effects on a dynamic circuit using single-channel thin-film transistors. The dynamic circuit performs its circuit operation by charging and discharging signal nodes by using a clock signal which is generated periodically. If the clock signal is not generated for a long time, an electric leak occurs to the signal nodes. While the leak can be prevented by adding high capacitance to the signal nodes, the circuit scale is necessitated to increase in this case.

Therefore, a display device according to another embodiment is configured to prevent the leak in the circuit implemented by single-channel transistors by charging the signal nodes by use of a clock signal that is outputted even in the interval between a write period and the next write period (i.e., in a touch sensing period) or a clock signal that is outputted even in the interval between a touch sensing period and the next touch sensing period (i.e., in a write period). Here, the single-channel transistors are implemented by n-channel thin-film transistors, for example. Since no high retention capacitance has to be added to the signal nodes, the area of the retention capacitance can be reduced, the circuit width can be reduced, and the frame of the display panel can be narrowed. Further, since the circuit can be formed with single-channel transistors without the need of using complementary transistors (CMOS devices), the number of steps in the manufacturing process can be reduced and cost reduction can be achieved.

While a liquid crystal display device in which the common electrodes are formed on the array substrate (liquid crystal display device of the so-called "horizontal electric field type") will be explained in the following example, the display device according to this embodiment is not limited to the horizontal electric field type; the display device of this embodiment is applicable also to liquid crystal display devices in which the common electrodes are formed on the counter substrate (liquid crystal display device of the so-called "vertical electric field type"). Further, the scan electrodes for the touch sensing are not limited to those used also as the common electrodes of the liquid crystal display device; the scan electrodes for the touch sensing may be formed to be used also as any type of electrodes for the displaying.

Example

A display device according to an example of the present disclosure is a display device of the in-cell type in which the touch panel is installed inside the display panel. The configuration of the display device according to the example will be explained below by referring to FIGS. 6-8.

Figure 6:
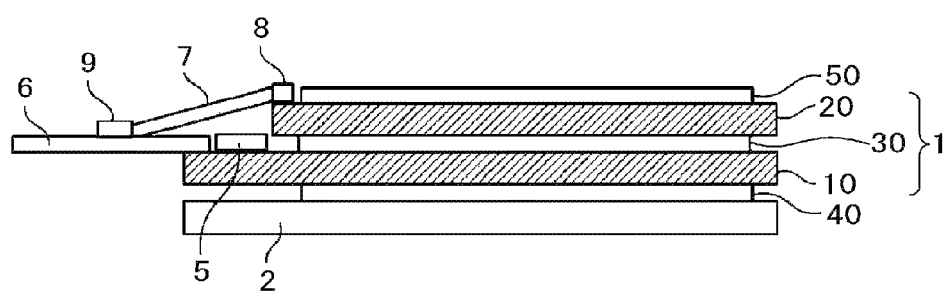
FIG. 6 is a cross-sectional view of a display device according to an example of the present disclosure.
Figure 7:
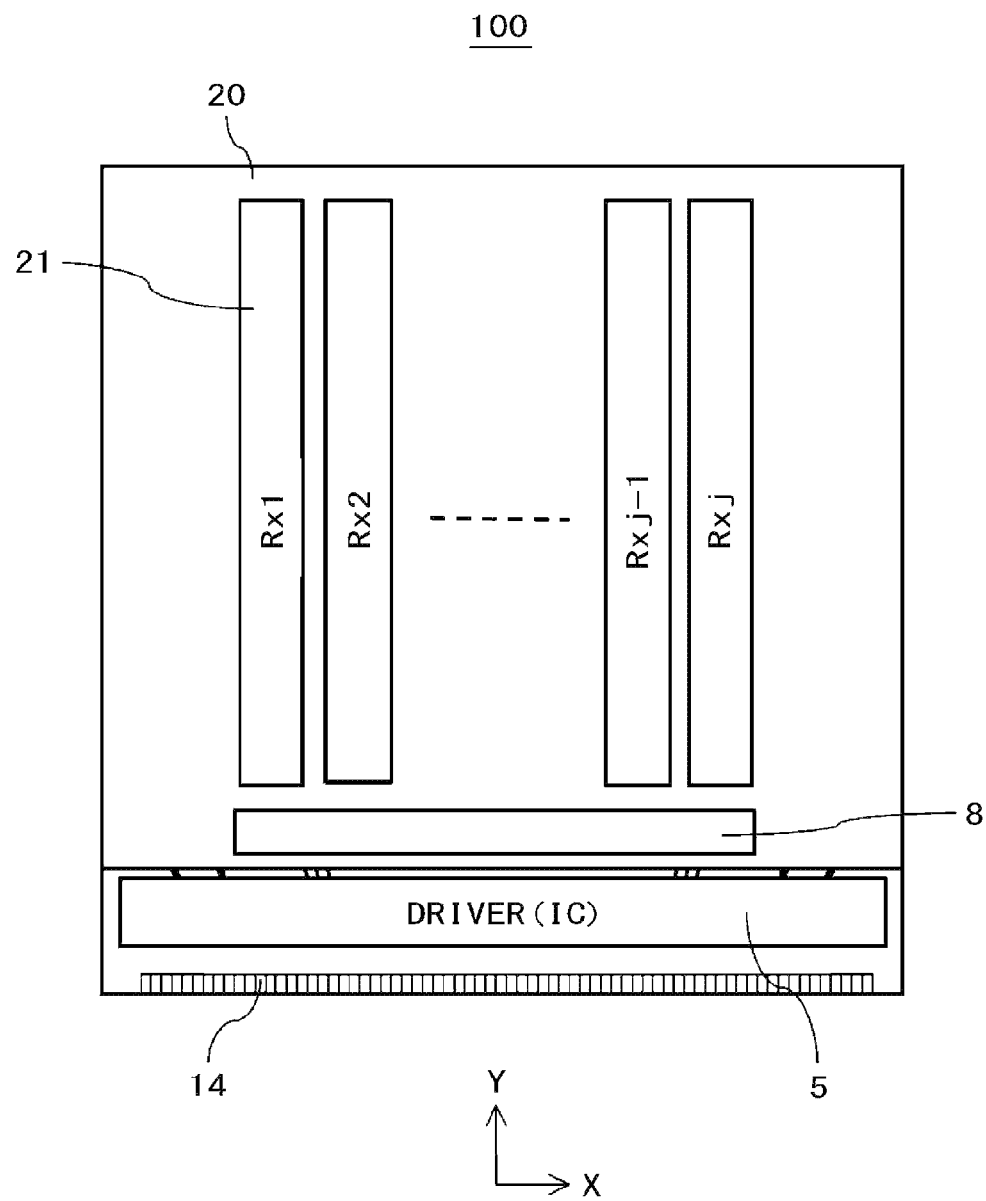
FIG. 7 is a plan view of a counter substrate of the display device according to the example.
Figure 8:
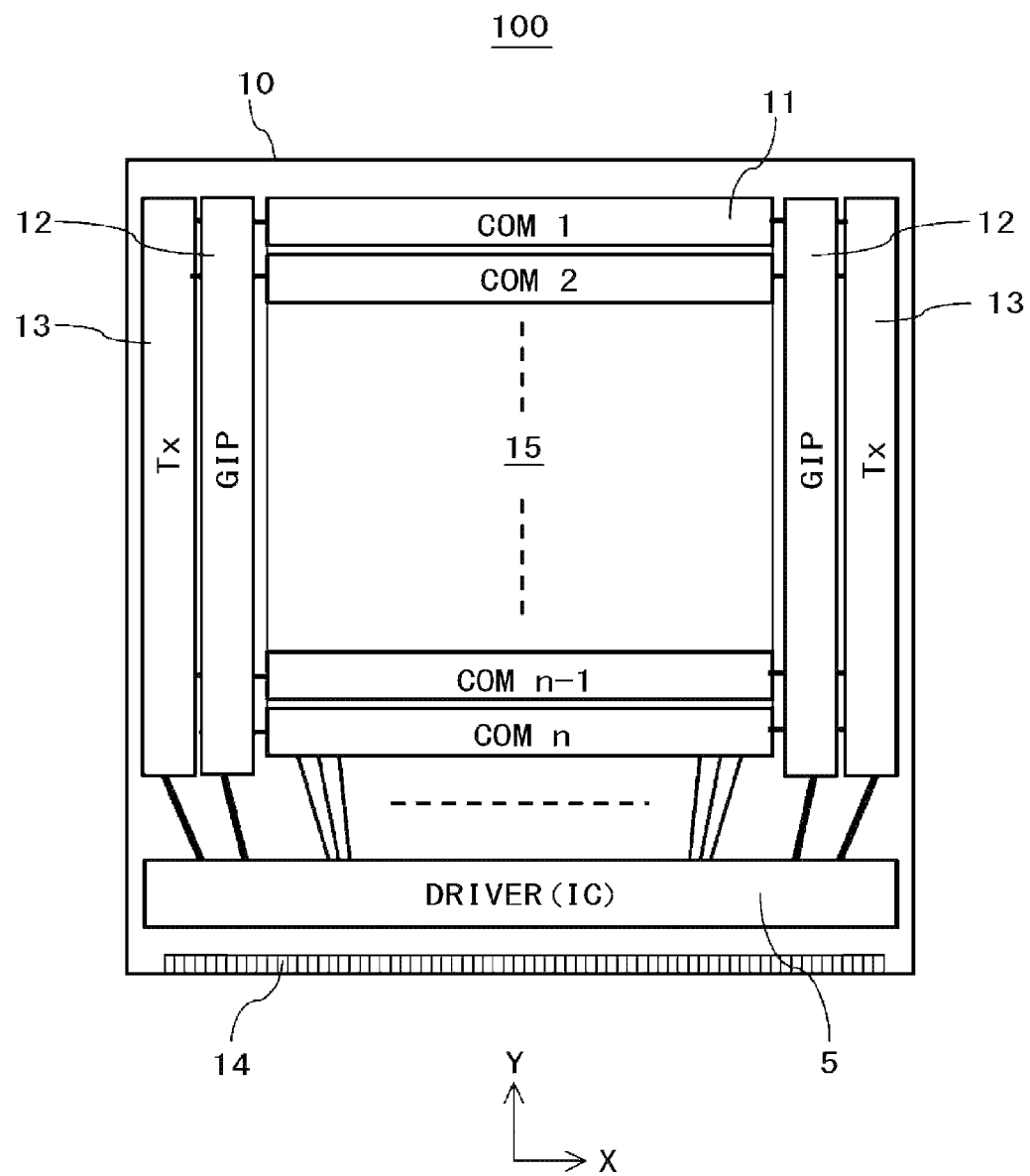
FIG. 8 is a plan view of an array substrate of the display device according to the example.

FIG. 6 is a cross-sectional view for explaining the display device according to the example. FIG. 7 is a plan view for explaining the counter substrate of the display device according to the example. FIG. 8 is a plan view for explaining the array substrate of the display device according to the example.

As shown in FIG. 6, the display device 100 according to the example comprises a display panel 1, a driver IC 5, flexible wiring boards 6 and 7, and a backlight 2. The display panel 1 is formed by stacking an array substrate 10 and a counter substrate 20 at a prescribed interval, bonding the array substrate 10 and the counter substrate 20 together by use of a sealing material (unshown) arranged like a frame in the peripheral part of the gap between the array substrate 10 and the counter substrate 20, enclosing and sealing a liquid crystal composition 30 inside the frame-like sealing material, and attaching polarizing plates 40 and 50 outside the array substrate 10 and the counter substrate 20.

As shown in FIG. 7, touch panel sensing electrodes 21 (Rx1, Rx2, . . . , Rxj−1, Rxj) are formed by partitioning a back side transparent conductive film on the counter substrate 20 into a stripe pattern. The touch panel sensing electrodes 21 extending in the Y direction are connected to a connection part 8. As shown in FIG. 8, a common electrode (counter electrode) 11 formed inside the array substrate 10 is partitioned into a stripe pattern (i.e., partitioned into a plurality of blocks) to be used also as scan electrodes of the touch panel. With this configuration, the touch panel substrate used for the ordinary type of touch panels is left out.

Further, in this display device 100, the circuits for the driving and the sensing of the touch panel are arranged inside the driver IC 5. The driver IC 5 is formed on one semiconductor substrate by a CMOS process. The driver IC 5 in the form of a semiconductor chip is mounted on the array substrate 10 by means of COG (Chip on Glass) mounting.

As shown in FIG. 8, n (e.g., 20) common electrodes 11 (COM1, COM2, . . . , COMn−1, COMn) are arranged on the array substrate 10. Both ends of each common electrode 11 are connected to a common scan circuit (Tx) 13. In the display device 100, the strip-shaped common electrodes 11 are used also as the scan electrodes. Therefore, the common scan circuit (Tx) 13 supplies the common voltage for the image display (Vcom, as a DC drive signal which will be explained later) and the touch panel scan voltage for the touch position sensing ($V_{TX}$, as an AC drive signal which will be explained later) to the common electrodes 11. In addition to the common scan circuit (Tx) 13, various circuits, wires, terminals, etc. such as a gate scan circuit (GIP) 12, scan signal lines (gate lines which will be explained later), video signal lines (drain lines which will be explained later) and an input terminal 14 for the driver IC 5 (as a connection terminal to be connected to the flexible wiring board 6) are formed on the array substrate 10. A selector circuit for selecting RGB video signals is unshown in FIG. 8 in order to avoid complication of the drawing.

A pixel part 15 is formed on the array substrate 10. In the pixel part 15, the common electrodes 11 and pixel electrodes (unshown) are used as parts of the pixels for the image display. One common electrode 11 is shared by a plurality of pixels (e.g., 64 lines of pixels). Capacitance is formed by sensing electrodes 21 arranged on the counter substrate 20 and the common electrodes 11 arranged on the array substrate 10. When the touch panel scan voltage ($V_{TX}$) is applied to the common electrodes 11, the voltage of the sensing electrodes 21 changes. In this case, when a conductor such as a finger of the user touches or approaches the screen, the capacitance changes and the voltage of a sensing electrode 21 changes from that in cases with no touching/approaching conductor. This change is extracted as a sensing signal and supplied to the driver IC 5 via the connection part 8, the flexible wiring board 7, a connector 9 and the flexible wiring board 6 as shown in FIG. 6. As above, by the sensing of the change in the capacitance between a common electrode 11 and a sensing electrode 21 formed inside, the display panel is allowed to have the function of the touch panel.

The display device 100 is capable of operating in either of the aforementioned first method and second method in terms of the write periods and the touch sensing periods. The selection between the first method and the second method is made by setting a value in the storage circuit (e.g., register) of the driver IC 5 from the host controller. The storage circuit (e.g., register) can include a register, a volatile memory (e.g., RAM) and/or an electrically rewritable non-volatile memory (EEPROM, flash memory, etc.).

The details of the configuration of the display device according to the example will be explained below by referring to FIGS. 9-11.

Figure 9:
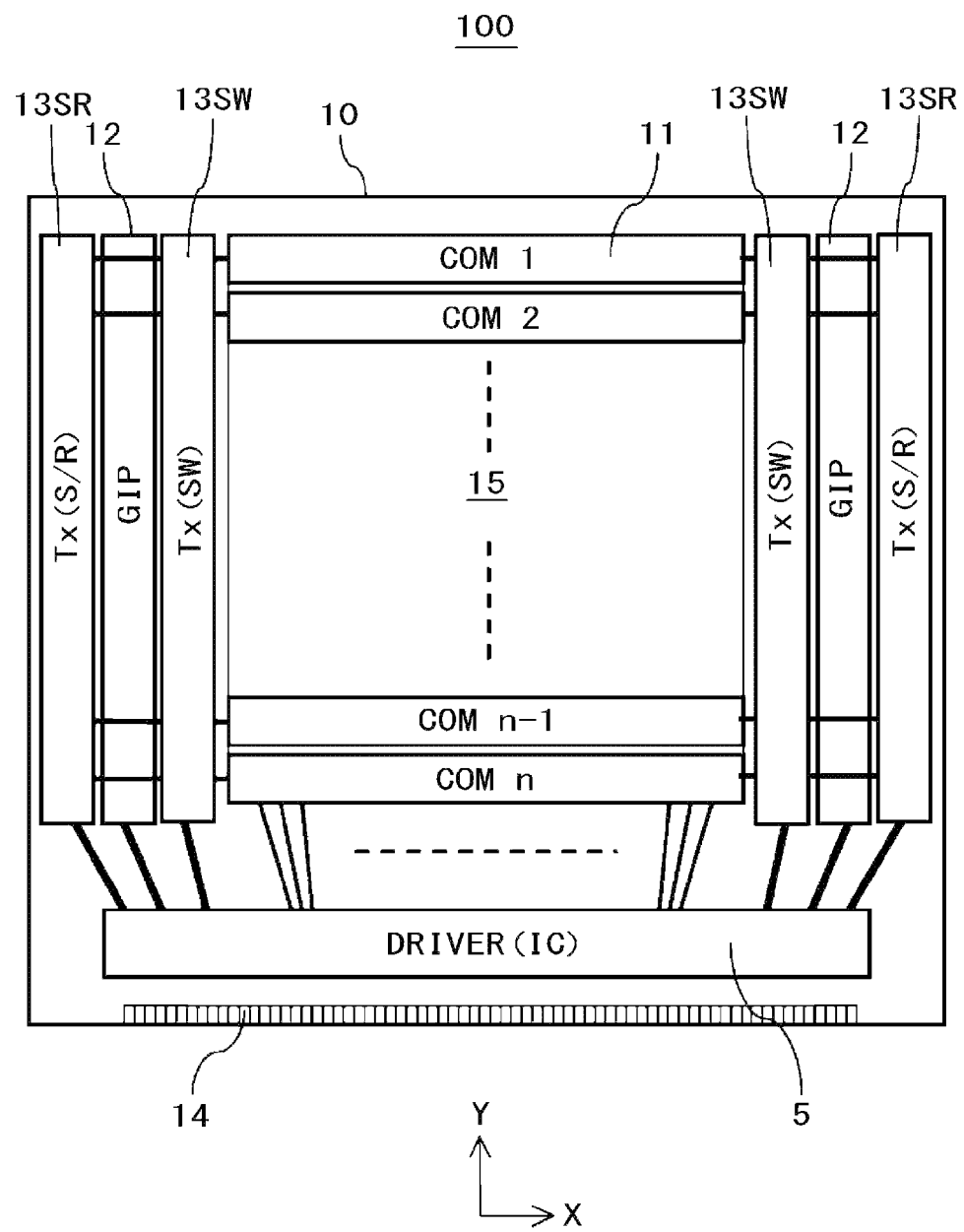
FIG. 9 is a plan view schematically showing an example of implementation of the display device according to the example.

FIG. 9 is a plan view for explaining the array substrate of the display device according to the example. FIG. 9 shows the details of FIG. 8. FIGS. 10 and 11 are block diagrams of the display device according to the example, wherein FIG. 10 shows the configuration of parts formed on the array substrate and FIG. 11 shows the configuration of a touch sensing part.

The driver IC 5 sends the video signals to the pixels (thin-film transistors TRmk and pixel electrodes PTmk which will be explained later) arranged in a matrix pattern in the pixel part 15 via wires (drain lines DLm which will be explained later) on the array substrate 10. The gate scan circuit (GIP) 12 is formed in the vicinity of the pixel part 15 (display area) of the array substrate 10 by using TFT (Thin Film Transistor) devices. In this example, the gate scan circuit 12 is arranged on the right side and the left side of the array substrate 10 in FIG. 9 and receives power supply voltage, control signals, etc. supplied from the driver IC 5 via wires. The gate scan circuit 12 in this example is configured to be able to drive the pixels (arranged in the matrix pattern in the pixel part 15) from both sides. However, the gate scan circuit 12 is not limited to the both-side driving type; the gate scan circuit 12 may also be configured to drive the gate lines one by one alternately from the left and from the right (one-side driving).

The common scan circuit 13 is partitioned into two parts: a shift register unit 13SR (Tx(S/R)) and a switch unit 13SW (Tx(SW)) which are arranged to sandwich the gate scan circuit 12. The common scan circuit 13 (13SR, 13SW) is formed on the array substrate 10 by using TFT devices. In this example, the common scan circuit 13 is arranged on the right side and the left side of the array substrate 10 in FIG. 9 and receives signals (e.g., the AC drive signal (VCOMAC) and the DC drive signal (VCOMDC) which will be explained later) supplied from the driver IC 5 via wires. The common scan circuit 13 in this example is configured to be able to drive each of the parallelly arranged common electrodes 11 (COM1, COM2, . . . , COMn−1, COMn) from both sides. However, the common scan circuit 13 is not limited to the both-side driving type; the common scan circuit 13 may also be configured to drive the common electrodes one by one alternately from the left and from the right (one-side driving). In cases where the common scan circuit 13 is formed of single-channel transistors as explained later, it is necessary to form the retention capacitance, etc. in the display panel. Therefore, arranging the shift register unit 13SR (Tx(S/R)), the gate scan circuit 12 and the switch unit 13SW (Tx(SW)) in this order from the edge of the display panel is desirable in view of restrictions on the layout (in order to arrange the retention capacitance (occupying a large layout area) in a spacious region in the vicinity of the display panel edge and to arrange a switch circuit (for driving the high-load common electrodes) in the vicinity of the pixel part 15).

Figure 10:
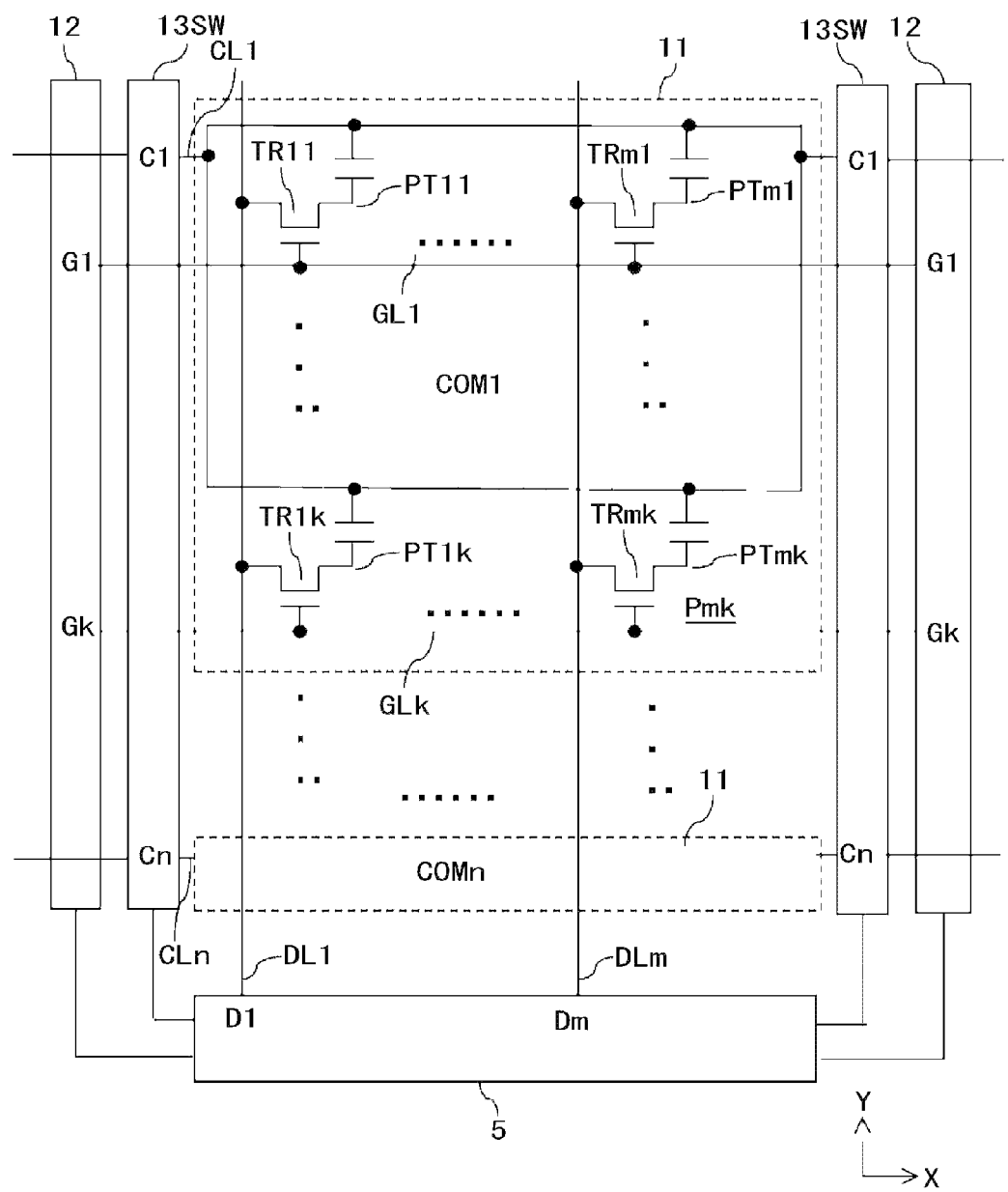
FIG. 10 is a block diagram showing the configuration of parts formed on the array substrate of the display device according to the example.

As shown in FIG. 10, the array substrate 10 is provided with n gate line sets (each including k gate lines GL1-GLk extending in the X direction), n common lines CL1-CLn extending in the X direction, and m drain lines DL1-DLm extending in the Y direction.

A region surrounded by adjacent gate lines and adjacent drain lines including the gate line GLk and the drain line DLm is a pixel region Pmk. The pixel region Pmk is equipped with a thin-film transistor TRmk and a pixel electrode PTmk. The drain electrode of the thin-film transistor TRmk is connected to the drain line DLm. The gate electrode of the thin-film transistor TRmk is connected to the gate line GLk. The source electrode of the thin-film transistor TRmk is connected to the pixel electrode PTmk. The common electrode 11 (COM1) is arranged to face the pixel electrode PTmk. The common electrode 11 (COM1) is connected to the common electrode signal line CL1. Each pixel region (such as the pixel region Pmk) is formed as a region surrounded by adjacent gate lines and adjacent drain lines. Thus, there are m×n×k pixel electrodes in total. Each common electrode 11 (COM1, COM2, . . . , COMn−1, COMn) is shared by m×k pixels.

The common scan circuit 13 is arranged in a left edge part and a right edge part of the array substrate 10. By the common scan circuit 13, common electrode signals (C1-Cn) are applied to the common lines CL1-CLn (parallelly extending in the X direction) from both ends (left and right ends). Further, the gate scan circuit 12 is also arranged in the left edge part and the right edge part of the array substrate 10. By the gate scan circuit 12, gate signals (G1, . . . , Gk, . . . , Gnk) are applied to the gate lines GL1-GLnk (parallelly extending in the X direction) from both ends (left and right ends). Furthermore, the driver IC 5 is arranged in a lower edge part of the array substrate 10. By the driver IC 5, the drain lines DL1-DLm parallelly extending in the Y direction are driven from the lower ends.

Figure 11:
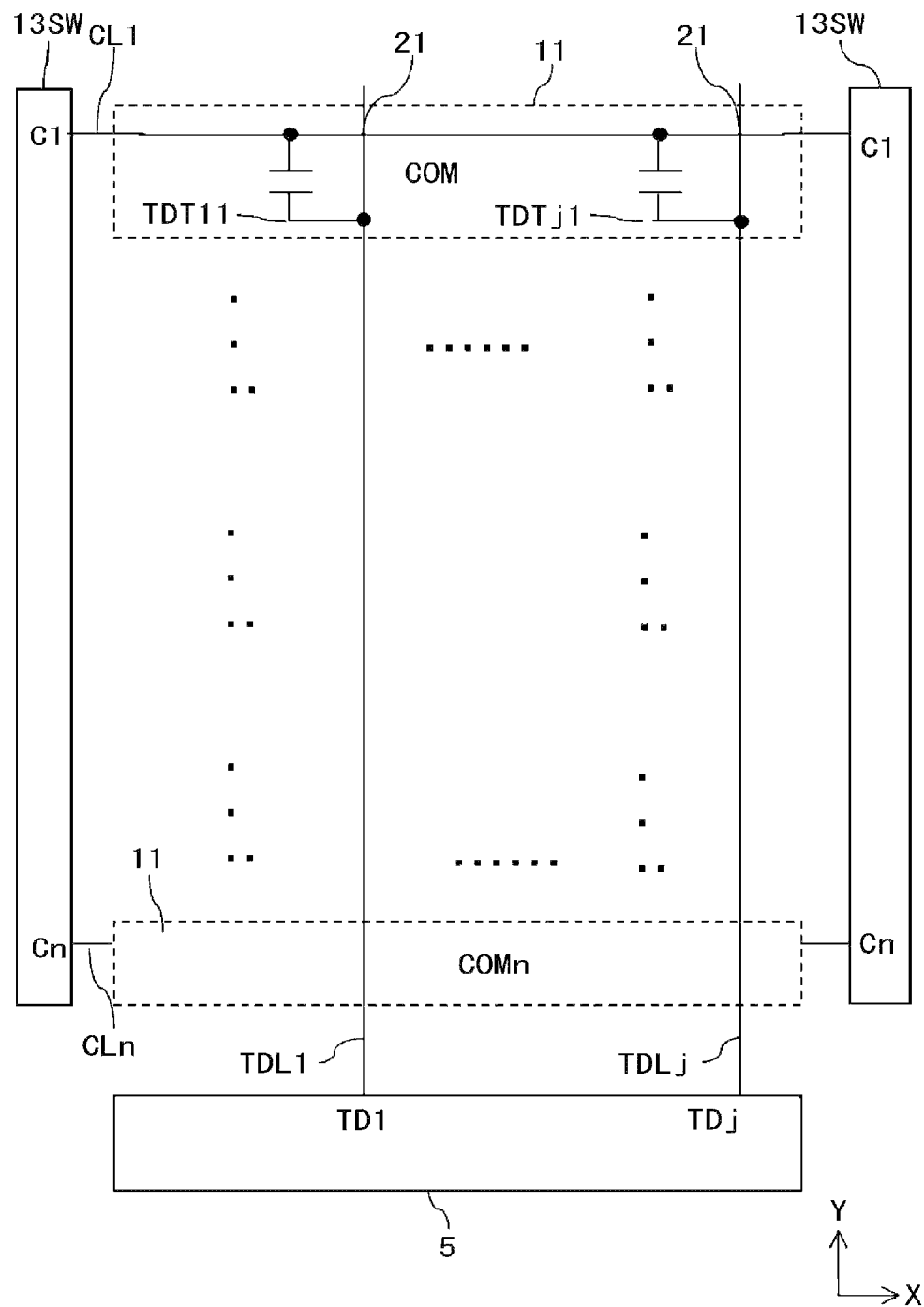
FIG. 11 is a block diagram showing the configuration of a touch sensing part of the display device according to the example.

As shown in FIG. 11, j sensing electrodes 21 (Rx1-Rxj) extending in the Y direction are arranged on the counter substrate 20. Signals (TD1-TDj) from the sensing electrodes 21 (Rx1-Rxj) are inputted to the driver IC 5 via sensing electrode signal lines TDL1-TDLj. The driver IC 5 includes a detection circuit (unshown) for detecting the touch on the screen. The detection circuit includes an integral circuit, a sample hold circuit, an A/D conversion circuit, a memory, a CPU, and so forth. The detection circuit may also be configured as an IC (Integrated Circuit) separate from the driver IC 5.

The gate scan circuit (first scan circuit) and the common scan circuit (second scan circuit) will be explained below. All the transistors used for the gate scan circuit and the common scan circuit are n-channel thin-film transistors (single-channel thin-film transistors) made of low-temperature polysilicon, for example. However, the transistors constituting the gate scan circuit and the common scan circuit are not limited/restricted to n-channel thin-film transistors. It goes without saying that the gate scan circuit and the common scan circuit can also be formed of p-channel thin-film transistors (single-channel thin-film transistors).

Gate Scan Circuit

The gate scan circuit of the display device according to the example will be explained below by referring to FIGS. 12-18.

While the gate scan circuit in the following explanation of the example is assumed to have both a 2-line simultaneous driving function and a successive line driving function, the gate scan circuit of the display device according to the example is not limited to such gate scan circuits. For example, the gate scan circuit may be configured to have the successive line driving function only. The power supply voltage, clock signals, control signals, etc. to be used by the gate scan circuit are generated by a voltage generation circuit, control circuit, etc. of the driver IC 5. The power supply voltage used by the gate scan circuit includes an intermediate voltage (DDVDH) and a low voltage (VGPL). The intermediate voltage (DDVDH) is a voltage that is enough to bring the transistors into conduction but is lower than a high voltage (VGH) of the gate signal which will be explained later in a chapter of the common scan circuit. The low voltage (VGPL) equals a low voltage of the gate signal. By the low voltage (VGPL) lower than the intermediate voltage (DDVDH), the conduction of the transistors is interrupted.

Overall Configuration

Figure 12:
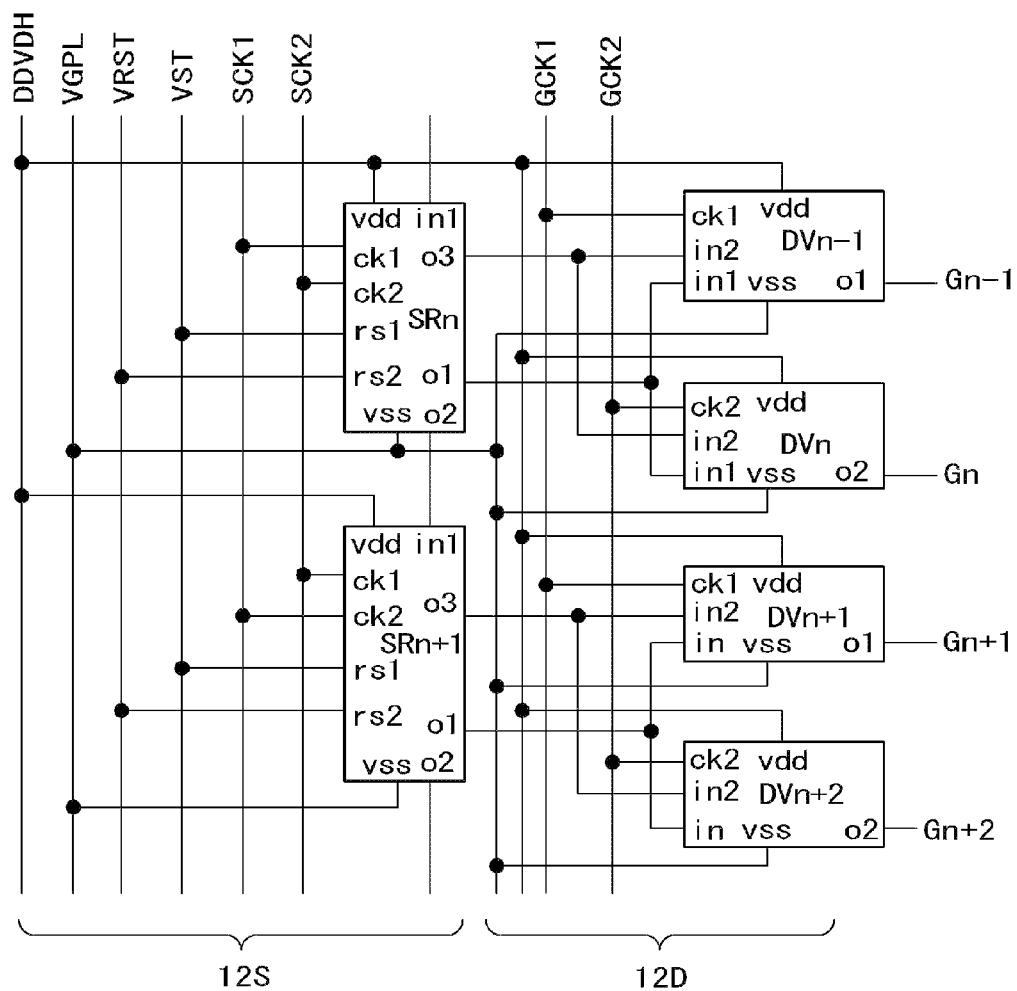
FIG. 12 is a block diagram of a gate scan circuit (2-line simultaneous scan circuit) of the display device according to the example.
Figure 13:
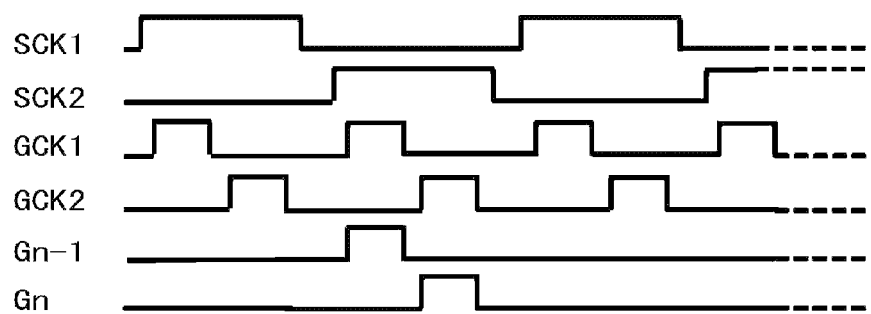
FIG. 13 is a timing chart of successive line driving.
Figure 14:
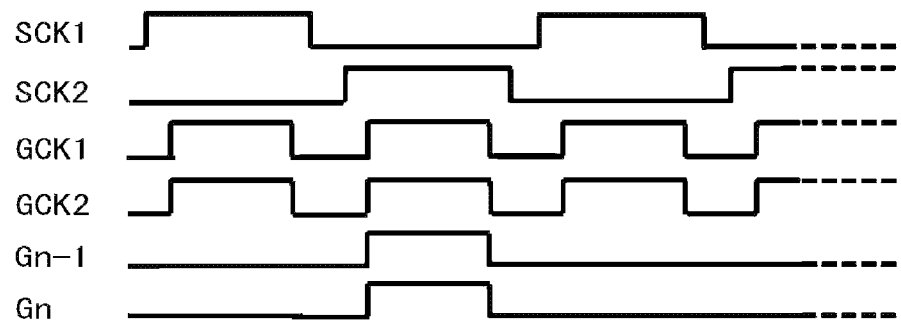
FIG. 14 is a timing chart of 2-line simultaneous driving.

FIG. 12 is a block diagram of the gate scan circuit of the display device according to the example. FIG. 13 is a timing chart of the successive line driving. FIG. 14 is a timing chart of the 2-line simultaneous driving.

The gate scan circuit 12 is made up of a shift register unit 12S (first shift register unit) having a forwarding function and a divider unit 12D having a function of outputting signals to the gate lines. In the shift register unit 12S, a shift register circuit SRn and a shift register circuit SRn+1 are connected in cascade connection. The shift register circuit SRn and the shift register circuit SRn+1 successively operate according to a first shift clock signal (SCK1) and a second shift clock signal (SCK2) differing in the phase. The divider unit 12D distributes the output of the shift register circuit SRn to two divider circuits DVn−1 and DVn. The divider circuit DVn−1 outputs a gate signal (Gn−1) to the gate line GLn−1 in response to a first gate clock signal (GCK1). The divider circuit DVn outputs a gate signal (Gn) to the gate line GLn in response to a second gate clock signal (GCK2). Similarly, the divider unit 12D distributes the output of the shift register circuit SRn+1 to two divider circuits DVn+1 and DVn+2. The divider circuit DVn+1 outputs a gate signal (Gn+1) to the gate line GLn+1 in response to the first gate clock signal (GCK1). The divider circuit DVn+2 outputs a gate signal (Gn+2) to the gate line GLn+2 in response to the second gate clock signal (GCK2).

Figure 15:
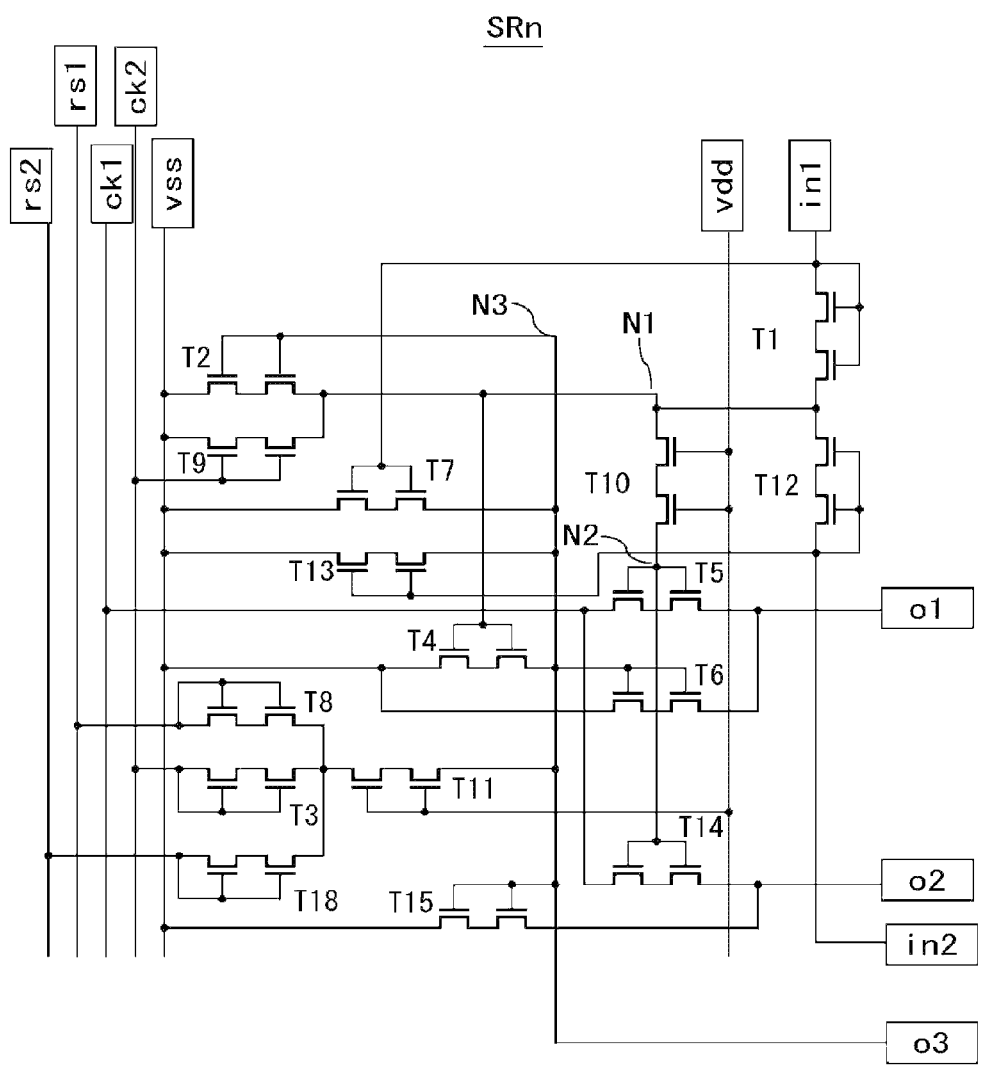
FIG. 15 is a circuit diagram of a shift register unit of the gate scan circuit of the display device according to the example.

Incidentally, part of signal lines, etc. shown in FIG. 15 are omitted in FIG. 12.

As shown in FIG. 13, in the successive line driving, the divider unit 12D outputs each scan signal (Gn−1, Gn, Gn+1, . . . ) in sync with the first gate clock signal (GCK1) or the second gate clock signal (GCK2) (differing in the phase) in a high period of the first shift clock signal (SCK1) or the second shift clock signal (SCK2).

As shown in FIG. 14, in the 2-line simultaneous driving, the divider unit 12D outputs scan signals (Gn−1, Gn) simultaneously in units of two lines in sync with the first gate clock signal (GCK1) and the second gate clock signal (GCK2) (in the same phase) in a high period of the first shift clock signal (SCK1) or the second shift clock signal (SCK2).

The display device 100 is capable of operating either in the successive line driving or in the 2-line simultaneous driving. The selection between the successive line driving and the 2-line simultaneous driving is made by setting a value in a storage circuit (e.g., register) of the driver IC 5 from the host controller. In cases where the gate scan circuit is not equipped with the 2-line simultaneous driving function, the divider unit 12D may be configured to have only one of the divider circuits DVn−1 and DVn.

Shift Register Unit

Figure 16:
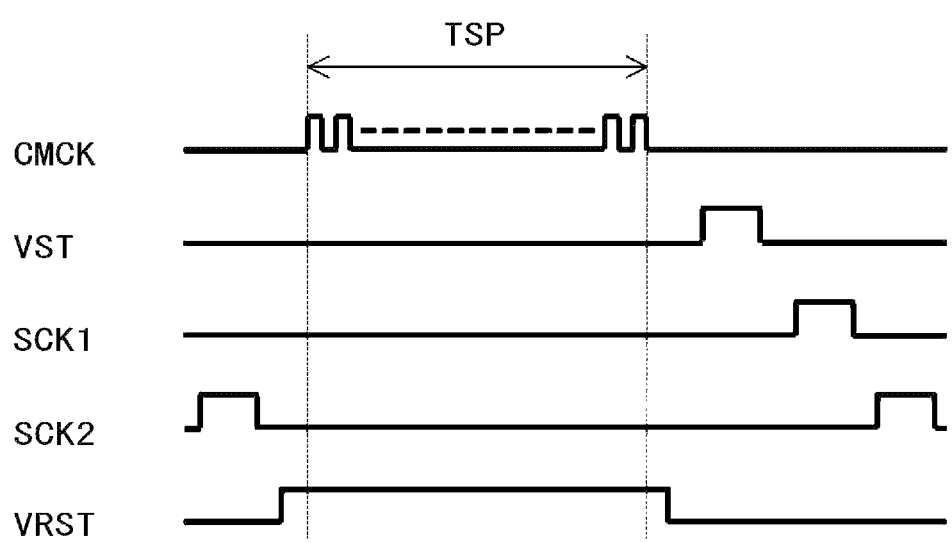
FIG. 16 is a timing chart of the shift register unit of the gate scan circuit operating in the second method.
Figure 17:
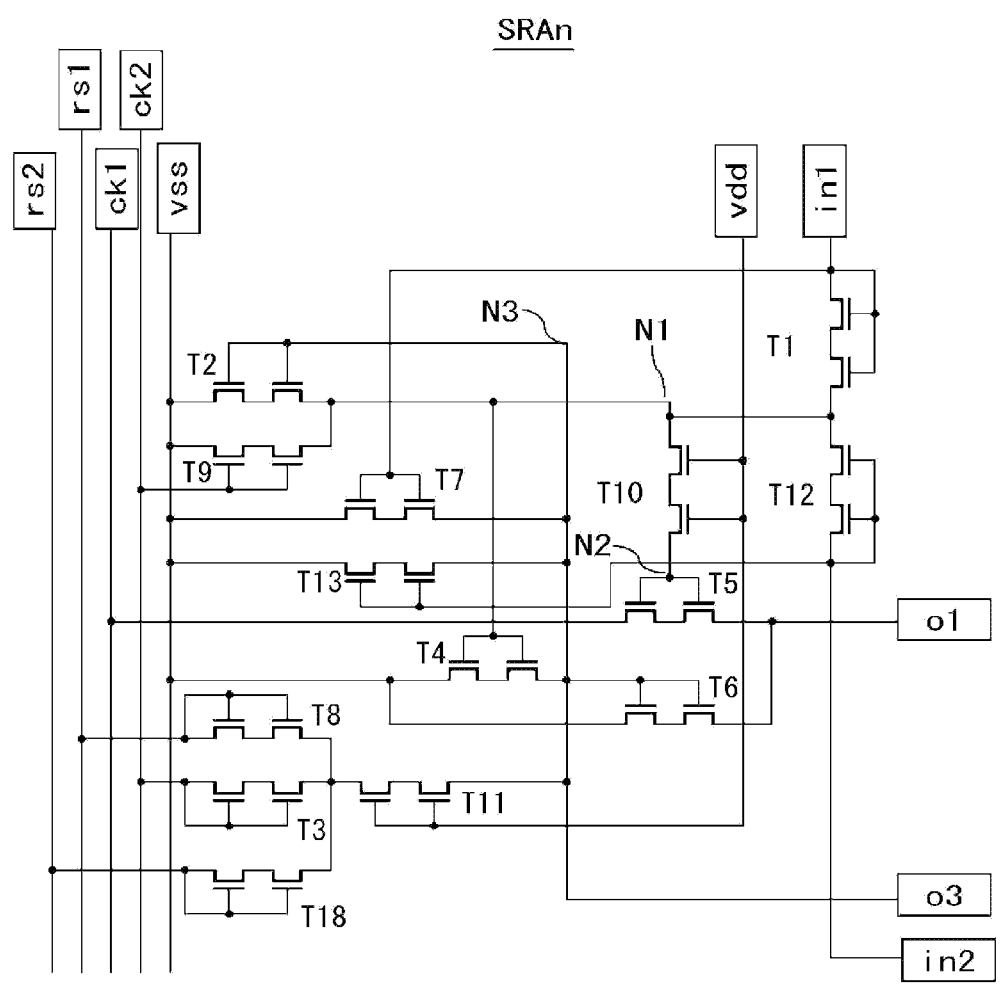
FIG. 17 is a circuit diagram of the shift register unit of the gate scan circuit according to a modification.

FIG. 15 is a circuit diagram of the shift register unit of the gate scan circuit of the display device according to the example. FIG. 16 is a timing chart of the shift register unit of the gate scan circuit operating in the second method. FIG. 17 is a circuit diagram of the shift register unit of the gate scan circuit according to a modification.

As shown in FIG. 15, the shift register circuit SRn of the shift register unit 12S has an input node in1 to which the output of a prior-stage shift register circuit SRn−1 is inputted, an input node ck1 to which the first shift clock signal (SCK1) is inputted, an input node ck2 to which the second shift clock signal (SCK2) is inputted, an input node rs1 to which a start signal (VST) is inputted, and an input node rs2 to which a first control signal (VRST) is inputted. The shift register circuit SRn further has a power supply node vdd to which the intermediate voltage (DDVDH) is inputted and a power supply node vss to which the low voltage (VGPL) is inputted. The shift register circuit SRn further has an output node o1 for outputting a signal to input nodes in1 of the divider circuits DVn−1 and DVn of the divider unit 12D, an output node o2 for outputting a signal to an input node in1 of the next-stage shift register circuit SRn+1, and an output node o3 for outputting a signal to input nodes in2 of the divider circuits DVn−1 and DVn.

The shift register circuit SRn includes a diode transistor T1 as an input circuit for the output of the prior-stage shift register circuit SRn−1, a transistor T2 for fixing the voltage of the gate electrode of a transistor T5 (explained later) at the low voltage (VGPL), a transistor T3 for charging a retention node N3 (first retention node), and a transistor T4 for resetting the retention node N3. The shift register circuit SRn further includes a transistor T5 for outputting the high voltage to the divider circuits DVn−1 and DVn of the divider unit 12D, a transistor T6 (third thin-film transistor) for outputting the low voltage to the divider circuits DVn−1 and DVn by using the retention node N3, a transistor T7 for resetting the retention node N3 according to the output of the prior-stage shift register circuit SRn−1, a transistor T8 for the initial resetting, and a transistor T9 for resetting the gate electrode of the transistor T5. The shift register circuit SRn further includes a voltage relaxation transistor T10 for limiting the voltage boosting performed by the transistor T5 by using the intermediate voltage (DDVDH) and a transistor T11 for lowering the voltage of the charging performed by the transistor T3 by using the intermediate voltage (DDVDH). The shift register circuit SRn further includes a transistor T14 (third thin-film transistor) for outputting the high voltage to the next-stage shift register circuit SRn+1, a transistor T15 for outputting the low voltage to the next-stage shift register circuit SRn+1 by using the retention node N3, and a transistor T18 (first thin-film transistor) for charging the retention node N3 according to the first control signal (VRST).

A diode transistor T12 as an input circuit for the output of the next-stage shift register circuit SRn+1 and a transistor T13 for resetting the retention node N3 according to the output of the next-stage shift register circuit SRn+1 are used when a bidirectional scan function should be implemented. The bidirectional scan function is a function of the gate scan circuit for performing the gate scan (driving) in either the normal direction or the reverse direction so that the image display can be carried out even when the screen is vertically inverted. The transistors T12 and T13 are unnecessary in cases where the bidirectional scan function is not used.

The shift register circuit SRn+1 is basically the same circuit as the shift register circuit SRn; however, part of the signals inputted are different. Specifically, while the input node in1 of the shift register circuit SRn receives the signal from the output node o2 of the prior-stage shift register circuit SRn−1, the input node in1 of the shift register circuit SRn+1 receives the signal from the output node o2 of the shift register circuit SRn. Further, while the input node ck1 of the shift register circuit SRn receives the first shift clock signal (SCK1), the input node ck1 of the shift register circuit SRn+1 receives the second shift clock signal (SCK2). Furthermore, while the input node ck2 of the shift register circuit SRn receives the second shift clock signal (SCK2), the input node ck2 of the shift register circuit SRn+1 receives the first shift clock signal (SCK1).

First, in response to the input of the high voltage of the start signal (VST) to the input node rs1 (reset operation), the shift register circuit SRn of the shift register unit 12S sets the retention node N3 at a high voltage by using the transistor T8. Subsequently, the high voltage of the output node o2 of the prior-stage shift register circuit SRn−1 is inputted to the input node in1 of the shift register circuit SRn, by which the transistor T7 is brought into conduction, the retention node N3 is connected to the power supply node vss (to which the low voltage (VGPL) is inputted) and thereby shifts to the low voltage, the transistor T1 is brought into conduction, and a node N1 shifts to the high voltage and thereafter remains at the high voltage. Accordingly, via the transistor T10 whose gate electrode is connected to the power supply node vdd to which the intermediate voltage (DDVDH) is applied, a node N2 is shifted to the high voltage and the transistors T5 and T14 are brought into conduction.

Subsequently, when the first shift clock signal (SCK1) inputted to the input node ck1 shifts to the high voltage, the voltage of the node N2 as the gates of the transistors T5 and T14 is boosted further by the so-called bootstrap effect and the high voltage is outputted to the output node o1. Thereafter, in response to the change in the first shift clock signal (SCK1), the low voltage is outputted to the output node o1.

Subsequently, the second shift clock signal (SCK2) inputted to the input node ck2 shifts to the high voltage, by which the transistor T3 is brought into conduction, the retention node N3 is raised to the high voltage and the transistor T9 is brought into conduction. Accordingly, the node N1 is lowered to the low voltage.

The node N1 lowers the node N2 to the low voltage via the transistor T10 and thereby reduces the voltage applied between the source and the drain of the transistor T2. Further, since the transistor T6 is brought into conduction by the high voltage of the retention node N3, the output node o1 is connected to the power supply node vss (to which the low voltage (VGPL) is inputted) and thereby fixed at the low voltage.

In this example, the transistor T10 is formed to have high voltage resistance by employing the double gate structure (stack of two transistors) in order to endure the voltage boosted up by the shift of the first shift clock signal (SCK1) to the high voltage. The other transistors are also formed similarly in the double gate structure.

Since no first shift clock signal (SCK1) or second shift clock signal (SCK2) is inputted in the touch sensing period (Tx circuit operation period (TSP)) as shown in FIG. 16, the retention node N3 is charged by using the transistor T18 by setting the first control signal (VRST) at the high voltage in the touch sensing period (TSP). This allows the transistor T6 to remain in the conducting state and fix the output node o1 at the low voltage during the touch sensing period (TSP). Incidentally, the signal CMCK collectively represents a first shift clock signal (CMCK1) and a second shift clock signal (CMCK2) of the shift register unit 13SR of the common scan circuit 13 which will be explained later. When the display device operates in the first method, the first control signal (VRST) may be fixed at the low voltage by setting a value in a storage circuit (e.g., register) of the driver IC 5 from the host controller.

FIG. 17 is a circuit diagram of the shift register unit of the gate scan circuit according to a modification. A shift register circuit SRAn according to the modification is configured by removing the transistors T14 and T15 and the output node o2 from the shift register circuit SRn according to the example shown in FIG. 15. An output node to the divider unit 12D and the output node to the next-stage shift register circuit SRn+1 (SRAn+1) are formed as a common output node (o1). Thus, the output node o1 of the shift register circuit SRAn is connected to the input nodes in1 of the divider circuits DVn−1 and DVn and to the input node in1 of the next-stage shift register circuit SRAn+1.

Divider Unit

Figure 18:
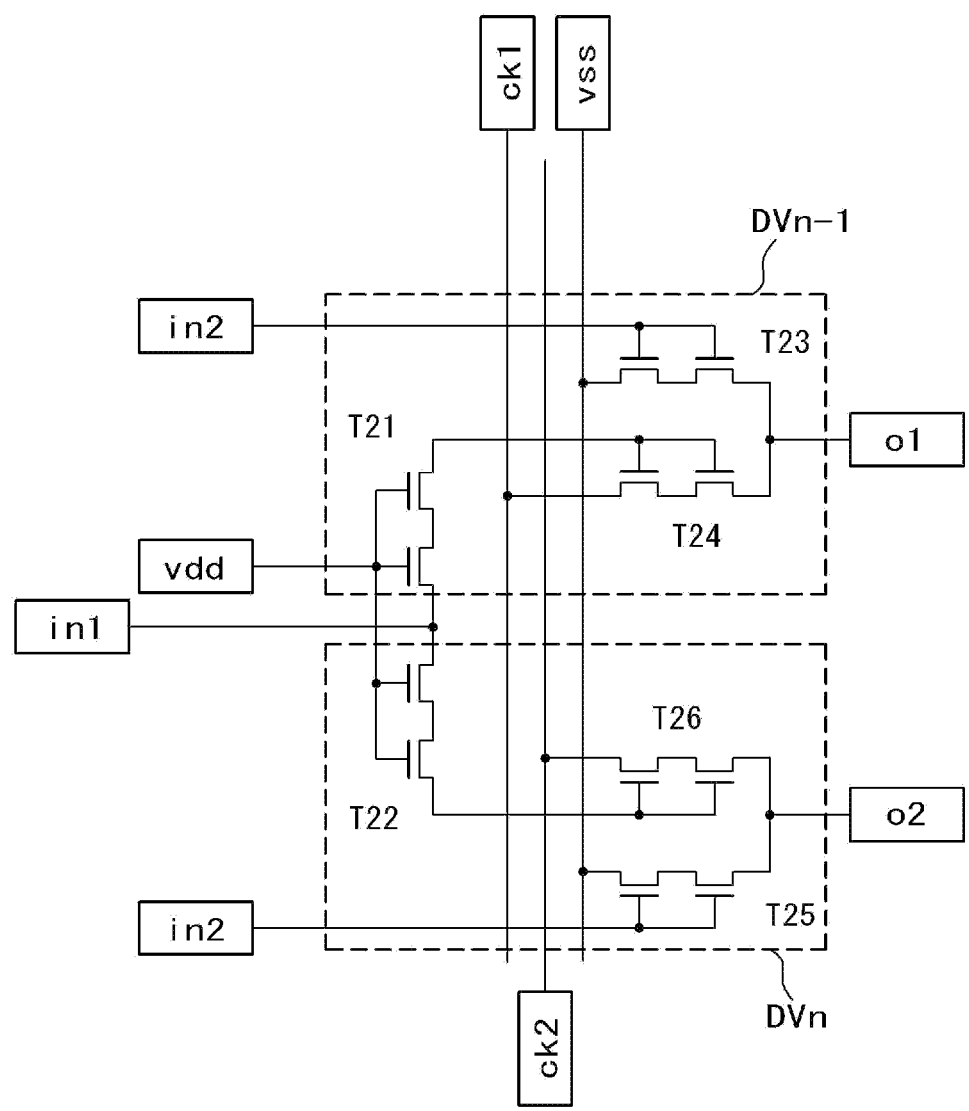
FIG. 18 is a circuit diagram of a divider unit of the gate scan circuit of the display device according to the example.

FIG. 18 is a circuit diagram of the divider unit of the gate scan circuit in the display device according to the example. In the divider unit 12D, the divider circuit DVDn shown in FIG. 18 is a circuit made by combining the divider circuits DVn−1 and DVn shown in FIG. 12. The divider circuits DVn−1 and DVn are basically the same circuits.

The divider circuit DVDn has an input node in1 to which the signal from the output node o1 of the shift register circuit SRn is inputted, an input node in2 to which the signal from the output node o3 of the shift register circuit SRn is inputted, a power supply node vdd to which the intermediate voltage (DDVDH) is inputted, and a power supply node vss to which the low voltage (VGPL) is inputted. The divider circuit DVDn further has an input node ck1 to which the first gate clock signal (GCK1) is inputted, an input node ck2 to which the second gate clock signal (GCK2) is inputted, an output node o1 for outputting the gate signal (Gn−1) to the gate line GLn−1, and an output node o2 for outputting the gate signal (Gn) to the gate line GLn. The divider circuit DVDn includes transistors T21 and T22 to which the output from the output node o1 of the shift register circuit SRn is inputted, transistors T23 and T25 (sixth thin-film transistors) for outputting the low voltage (VGPL) as the low voltage of the gate signals (Gn−1, Gn), and transistors T24 and T26 (fifth thin-film transistors) for outputting the first gate clock signal (GCK1) and the second gate clock signal (GCK2) as the high voltage of the gate signals (Gn−1, Gn).

The intermediate voltage (DDVDH) is applied to the gate electrodes of the transistors T21 and T22. The transistors T21 and T22 serve to relax the intensity of the source-drain voltage of the transistor T6 of the shift register circuit SRn when the gate electrodes of the transistors T24 and T26 are boosted by the bootstrap effect.

The gate electrodes of the transistors T23 and T25 are connected to the output node o3 of the shift register circuit SRn. The gate electrodes of the transistors T23 and T25 need no retention capacitance since the input node in2 of the divider circuit DVDn is connected to the retention node N3 of the shift register circuit SRn which is charged by the second shift clock signal (SCK2) and the first control signal (VRST).

The leak is prevented by charging the signal node (retention node N3) by using the first control signal (VRST) which is outputted even in the interval between a write period and the next write period (i.e., in a touch sensing period (TSP)). Since no high retention capacitance has to be added to the signal nodes, the area of the retention capacitance can be reduced, the circuit width can be reduced, and the frame of the display panel can be narrowed. Further, since the gate scan circuit can be formed with single-channel thin-film transistors without the need of using complementary thin-film transistors (CMOS devices), the number of steps in the manufacturing process can be reduced and cost reduction can be achieved.

Even when the driving is performed with a 120 Hz signal by means of the 2-line simultaneous driving, operation equivalent to the driving with the ordinary 60 Hz signal can be achieved. In cases where a display device other than the display device of the present disclosure is driven with the 120 Hz signal, it is also possible to drive the display device of the present disclosure in the successive line driving by using the signal of the same frequency. For example, it is possible to drive the finder display of the finder (of a high-spec camera such as a single-lens reflex camera) with the 120 Hz signal and drive a liquid crystal display monitor (employing the display device of the present disclosure) in the successive line driving with the 120 Hz signal. Since the liquid crystal refresh rate is increased by the successive line driving with the 120 Hz signal, the video display characteristics of the liquid crystal display can be improved. Further, the time lag at the time of pressing the shutter button can be reduced.

Common Scan Circuit

The common scan circuit of the display device according to the example will be explained below by referring to FIGS. 19-23.

The power supply voltage, clock signals, control signals, etc. to be used by the common scan circuit are generated by the voltage generation circuit, control circuit, etc. of the driver IC 5. The power supply voltage used by the common scan circuit includes the high voltage (VGH) and the low voltage (VGPL). The high voltage (VGH), which is equal to the high voltage of the gate signal, brings the transistors into conduction. The low voltage (VGPL), which is equal to the low voltage of the gate signal, interrupts the conduction of the transistors.

Overall Configuration

Figure 19:
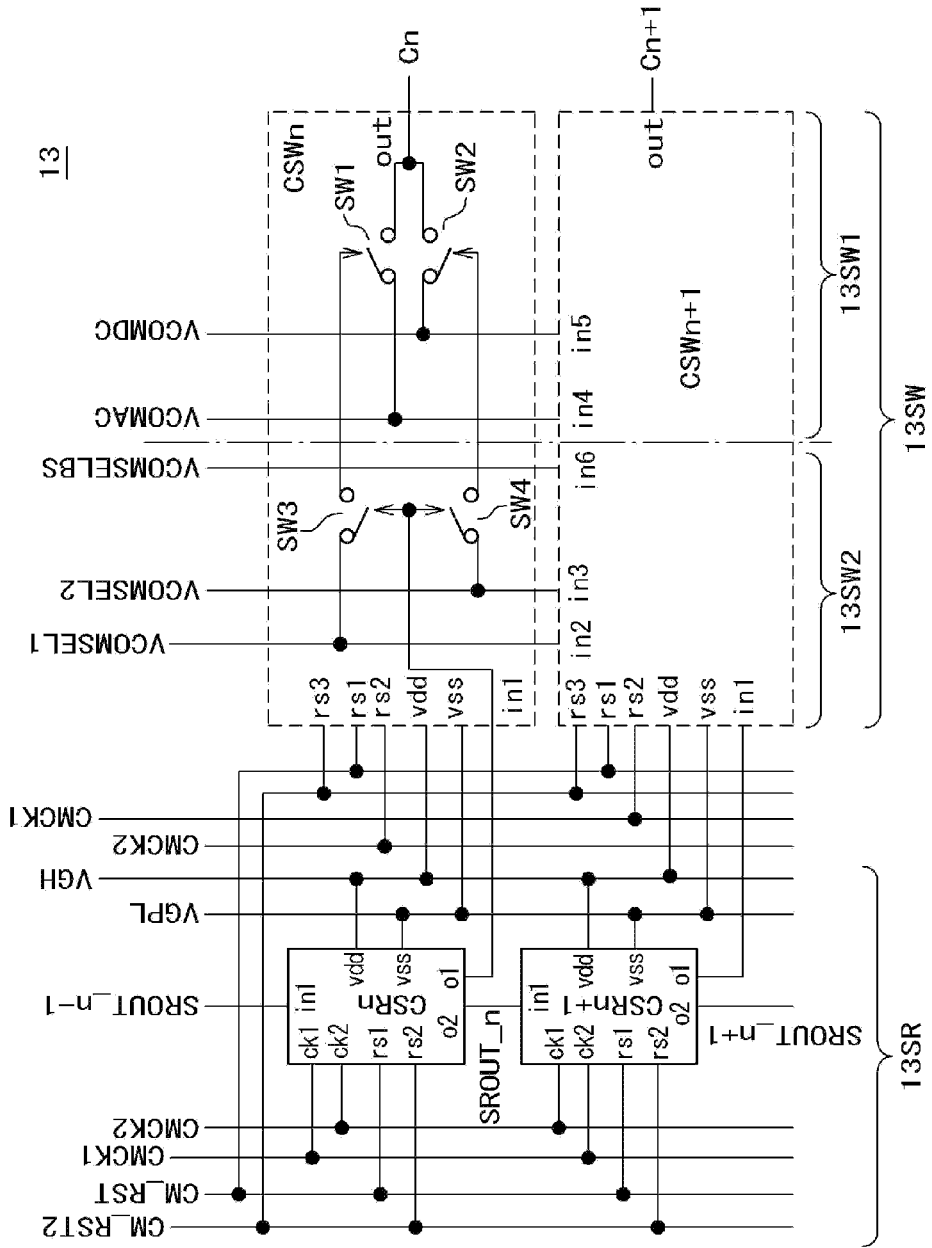
FIG. 19 is a block diagram of a common scan circuit of the display device according to the example.

FIG. 19 is a block diagram of the common scan circuit of the display device according to the example.

Figure 20:
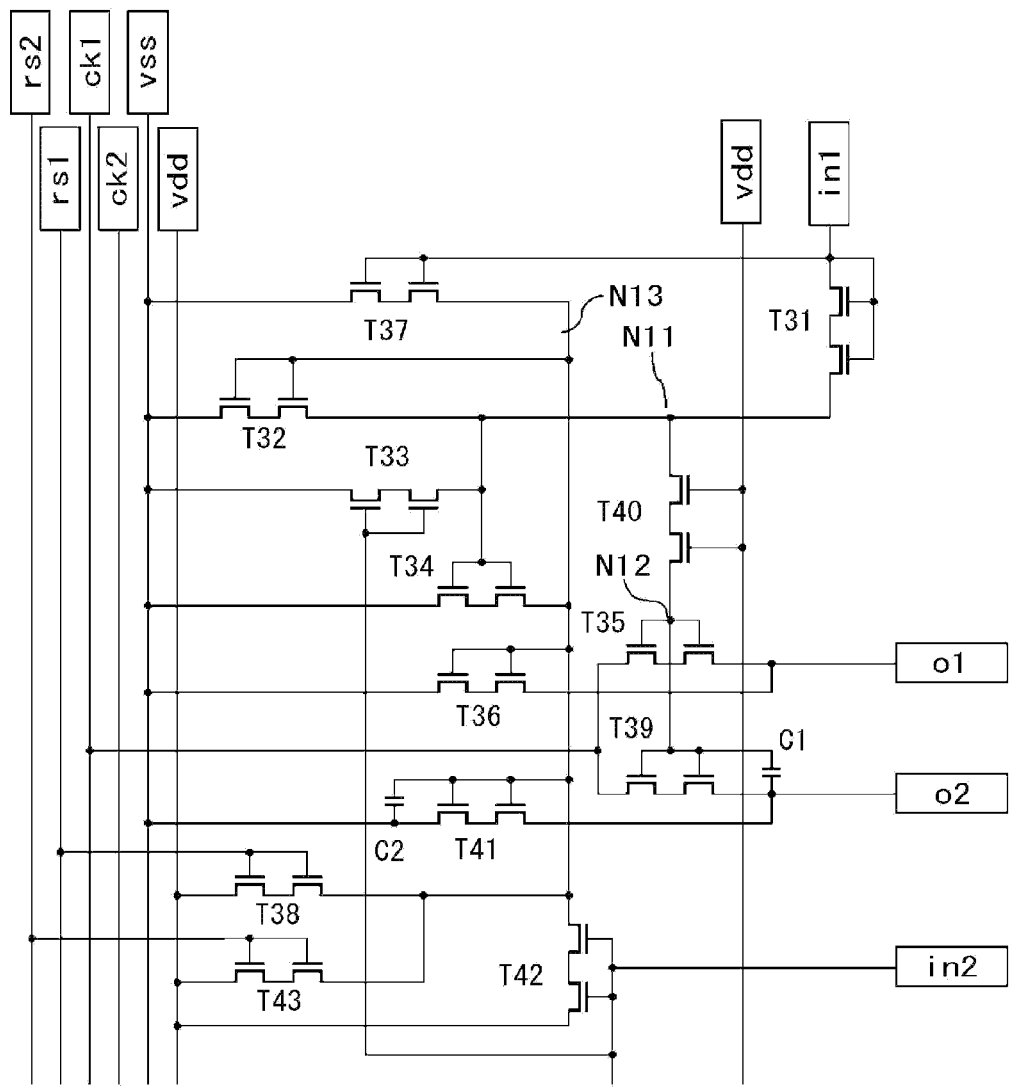
FIG. 20 is a circuit diagram of a shift register unit of the common scan circuit of the display device according to the example.

As shown in FIG. 19, the common scan circuit 13 is made up of the shift register unit 13SR (second shift register unit) and the switch unit 13SW. The shift register unit 13SR successively forwards its output according to the first shift clock signal (CMCK1) and the second shift clock signal (CMCK2). By the forwarded output, switches SW3 and SW4 of the switch unit 13SW are successively brought into conduction. Switches SW1 and SW2 of the switch unit 13SW make the switching between the AC drive signal (VCOMAC) and the DC drive signal (VCOMDC) according to a first selection signal (VCOMSEL1) or a second selection signal (VCOMSEL2) and thereby output the common electrode signals (Cn, Cn+1). The DC drive signal (VCOMDC) is supplied to the common electrodes to which the AC drive signal (VCOMAC) is not supplied in the touch sensing periods (TPs). Even though no first shift clock signal (CMCK1) or second shift clock signal (CMCK2) is inputted and the shift register unit 13SR does not operated in the write periods (PSPs), the DC drive signal (VCOMDC) is supplied to all the common electrodes from the switch unit 13SW. Incidentally, part of signal lines, etc. shown in FIG. 20 are omitted in FIG. 19. It is also possible to arrange the gate scan circuit 12 between a switch unit 13SW1 and a switch unit 13SW2 and thereby arrange the shift register unit 13SR, the switch unit 13SW2, the gate scan circuit 12 and the switch unit 13SW1 in this order from the edge of the display panel.

Shift Register Unit

Figure 21:
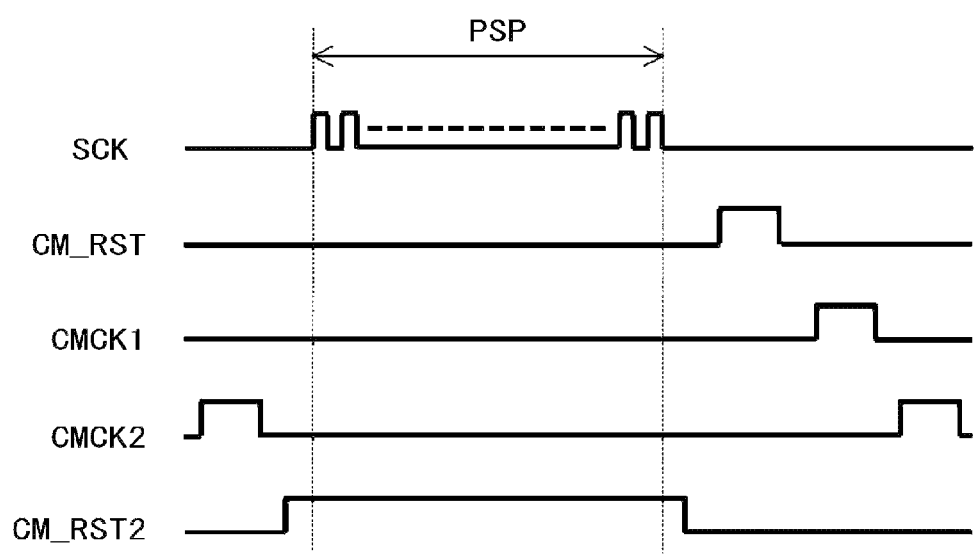
FIG. 21 is a timing chart of the shift register unit operating in the second method.

FIG. 20 is a circuit diagram of the shift register unit of the common scan circuit of the display device according to the example. FIG. 21 is a timing chart of the shift register unit of the common scan circuit of the display device according to the example.

As shown in FIG. 20, a shift register circuit CSRn of the shift register unit 13SR has an input node in1 to which the output of a prior-stage shift register circuit CSRn−1 is inputted, an input node ck1 to which the first shift clock signal (CMCK1) is inputted, an input node ck2 to which the second shift clock signal (CMCK2) is inputted, an input node rs1 to which a start signal (CM_RST) is inputted, and an input node rs2 to which a second control signal (CM_RST2) is inputted. The shift register circuit CSRn further has a power supply node vdd to which the high voltage (VGH) is inputted and a power supply node vss to which the low voltage (VGPL) is inputted. The shift register circuit CSRn further has an output node o1 for outputting a signal to an input node in1 of a switch circuit CSWn of the switch unit 13SW and an output node o2 for outputting a signal to an input node in1 of a next-stage shift register circuit CSRn+1.

The shift register circuit CSRn includes a diode transistor T31 as an input circuit for the output of the prior-stage shift register circuit CSRn−1, a transistor T32 for fixing the voltage of the gate electrode of a transistor T35 (explained later) at the low voltage (VGPL), a transistor T33 for resetting a node N11, and a transistor T34 for resetting a retention node N13 (second retention node). The shift register circuit CSRn further includes a transistor T35 for outputting the high voltage to the switch circuit CSWn, a transistor T36 (fourth thin-film transistor) for outputting the low voltage to the switch circuit CSWn by using the retention node N13, a transistor T37 for resetting the retention node N13 according to an input signal from an output node of the prior-stage shift register circuit CSRn−1, and a transistor T38 for the initial resetting. The shift register circuit CSRn further includes a voltage relaxation transistor T40 for limiting the voltage boosting performed by the transistor T35 to the high voltage (VGH) and a transistor T42 for resetting the retention node N13 according to an input signal from an output node of the next-stage shift register circuit CSRn+1. The shift register circuit CSRn further includes a transistor T39 for outputting the high voltage to the next-stage shift register circuit CSRn+1, a capacitance C1, a transistor T41 (fourth thin-film transistor) for outputting the low voltage to the next-stage shift register circuit CSRn+1 by using the retention node N13, a capacitance C2, and a transistor T43 (second thin-film transistor) for charging the retention node N13 according to the second control signal (CM_RST2).

The shift register circuit CSRn+1 is basically the same circuit as the shift register circuit CSRn; however, part of the signals inputted are different. Specifically, while the input node in1 of the shift register circuit CSRn receives the signal (SROUT_n−1) from the output node o2 of the prior-stage shift register circuit CSRn−1, the input node in1 of the shift register circuit CSRn+1 receives the signal (SROUT_n) from the output node o2 of the shift register circuit CSRn. Further, while the input node ck1 of the shift register circuit CSRn receives the first shift clock signal (CMCK1), the input node ck1 of the shift register circuit CSRn+1 receives the second shift clock signal (CMCK2). Furthermore, while the input node ck2 of the shift register circuit CSRn receives the second shift clock signal (CMCK2), the input node ck2 of the shift register circuit CSRn+1 receives the first shift clock signal (CMCK1).

First, in response to the input of the high voltage of the start signal (CM_RST) to the input node rs1 (reset operation), the shift register unit 13SR sets the retention node N13 at the high voltage. Subsequently, the high voltage of the output node o2 of the prior-stage shift register circuit CSRn−1 is inputted to the input node in1 of the shift register circuit CSRn, by which the transistors T37 and T34 are brought into conduction, the retention node N13 is connected to the low voltage (VGPL) and thereby shifts to the low voltage, the transistor T31 is brought into conduction, and the node N11 shifts to the high voltage and thereafter remains at the high voltage. Accordingly, via the transistor T40 to whose gate electrode the high voltage (VGH) is applied, a node N12 is shifted to the high voltage and the transistor T35 is brought into conduction.

Subsequently, when the first shift clock signal (CMCK1) inputted to the input node ck1 shifts to the high voltage, the voltage of the node N12 as the gates of the transistors T35 and T39 is boosted further by the so-called bootstrap effect and the high voltage is outputted to the input node in1 of the switch circuit CSWn and the input node in1 of the next-stage shift register circuit CSRn+1. Thereafter, in response to the change of the first shift clock signal (CMCK1), the low voltage is outputted to the input node in1 of the switch circuit CSWn and the input node in1 of the next-stage shift register circuit CSRn+1.

Subsequently, the second shift clock signal (CMCK2) shifts to the high voltage. Accordingly, the high voltage is inputted to the gate of the transistor T33 from the output node o2 of the next-stage shift register circuit CSRn+1 via the input node in2, the transistor T33 is brought into conduction, and the node N11 is lowered to the low voltage. Further, the high voltage is inputted to the gate of the transistor T42, the transistor T42 is brought into conduction, and the node N13 is raised to the high voltage. The node N11 lowers the node N12 to the low voltage via the transistor T40. The transistors T36 and T41 are brought into conduction by the high voltage of the node N13, by which the outputs to the output nodes o1 and o2 are connected to the low voltage (VGPL) and fixed at the low voltage.

In this example, the transistor T40 is formed to have high voltage resistance by employing the double gate structure (stack of two transistors) in order to endure the voltage boosted up by the shift of the first shift clock signal (CMCK1) to the high voltage. The other transistors are also formed similarly in the double gate structure.

Since no first shift clock signal (CMCK1) or second shift clock signal (CMCK2) is inputted in the write period (gate circuit operation period (PSP)) as shown in FIG. 21, the node N13 is charged by using the transistor T43 by setting the second control signal (CM_RST2) at the high voltage in the write period (PSP). This allows the transistors T36 and T41 to remain in the conducting state and fix the output node o1 at the low voltage during the write period (PSP). Incidentally, the signal SCK collectively represents the first shift clock signal (SCK1) and the second shift clock signal (SCK2) of the shift register unit 12S of the gate scan circuit 12. When the display device operates in the first method, the second control signal (CM_RST2) may be fixed at the low voltage by setting a value in a storage circuit (e.g., register) of the driver IC 5 from the host controller.

Switch Unit

Figure 22:
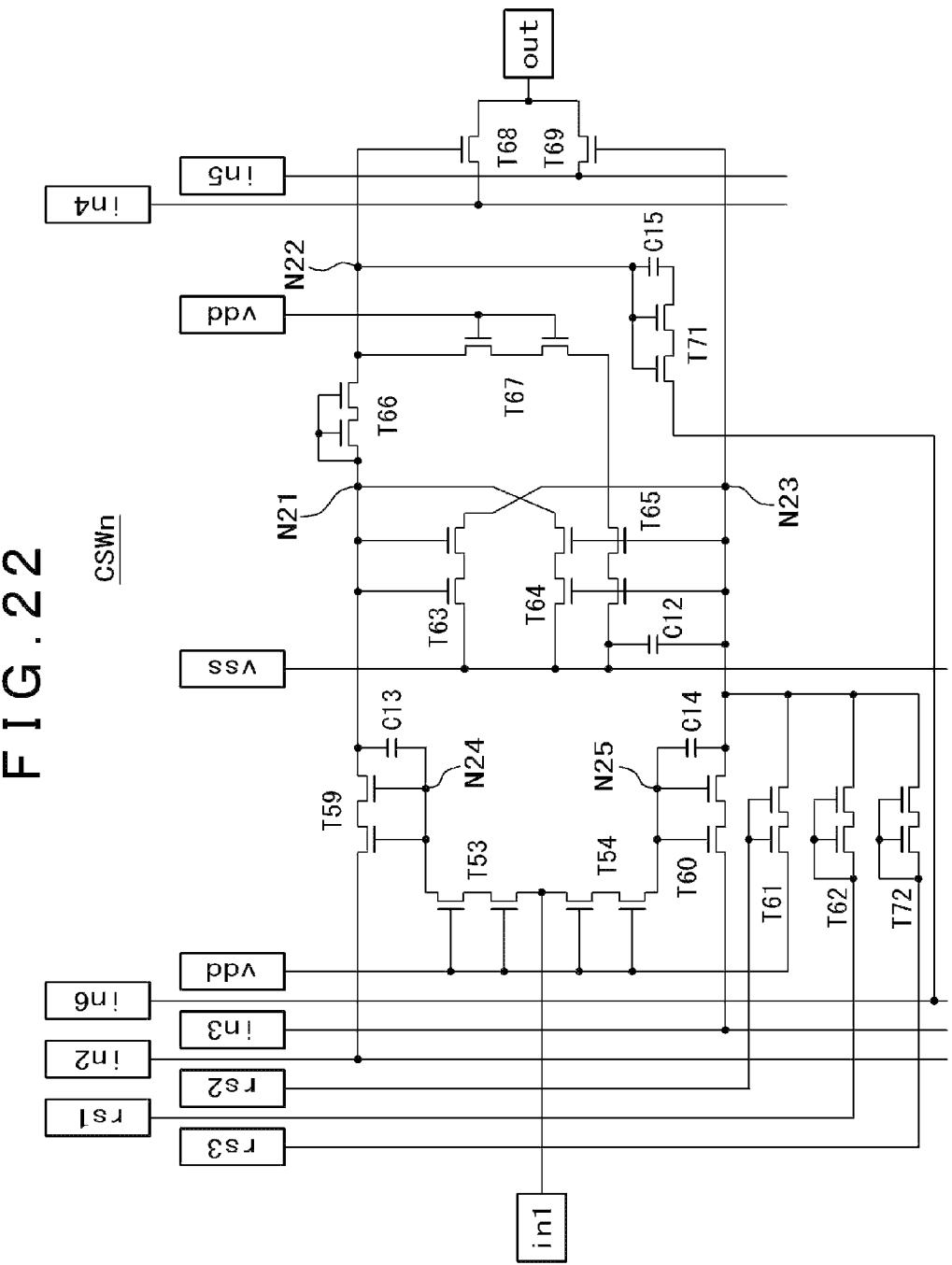
FIG. 22 is a circuit diagram of a switch unit of the common scan circuit of the display device according to the example.

FIG. 22 is a circuit diagram of the switch unit of the common scan circuit of the display device according to the example.

As shown in FIG. 22, the switch circuit CSWn of the switch unit 13SW has an input node in1 to which the output of the shift register circuit CSRn is inputted, an input node in2 to which the first selection signal (VCOMSEL1) is inputted, and an input node in3 to which the second selection signal (VCOMSEL2) is inputted. The switch circuit CSWn further has an input node rs1 to which the start signal (CM_RST) is inputted, an input node rs2 to which the second shift clock signal (CMCK2) is inputted, and an input node rs3 to which the second control signal (CM_RST2) is inputted. The switch circuit CSWn further has an input node in4 to which the AC drive signal (VCOMAC) is inputted, an input node in5 to which the DC drive signal (VCOMDC) is inputted, and an input node in6 to which a boost control signal (VCOMSELBST) is inputted. The switch circuit CSWn further has a power supply node vdd to which the high voltage (VGH) is inputted, a power supply node vss to which the low voltage (VGPL) is inputted, and an output node "out" for outputting the common electrode signal (Cn) to the common electrode signal line CLn.

The switch circuit CSWn includes transistors T53 and T54 to which the output of the shift register circuit CSRn of the shift register unit 13SR is inputted, a transistor T59 (tenth thin-film transistor) and a transistor T60 to which the first selection signal (VCOMSEL1) and the second selection signal (VCOMSEL2) are respectively inputted, and boosting capacitances C13 and C14. The switch circuit CSWn further includes a charging transistor T61 for charging a retention node N23 (third retention node) up to the high voltage (VGH), a transistor T62 for initializing the retention node N23, a transistor T63 for resetting the retention node N23, a transistor T72 (ninth thin-film transistor) for charging the retention node N23, and a retention capacitance C12. The switch circuit CSWn further includes a transistor T64 for resetting a node N21, a transistor T65 for resetting a node N22 (first node), a diode transistor T66 for boosting the voltage of the node N22, a voltage relaxation transistor T67, a transistor T71 (eleventh thin-film transistor) for charging the node N22, and a boosting capacitance C15. The switch circuit CSWn further includes a transistor T68 (eighth thin-film transistor) for outputting the AC drive signal (VCOMAC) inputted to the input node in4 and a transistor T69 (seventh thin-film transistor) for outputting the DC drive signal (VCOMDC) inputted to the input node in5. The transistors T53 and T54 serve to relax the intensity of the source-drain voltage of the transistor T36 of the shift register unit 13SR when the gate electrodes of the transistors T59 and T60 are boosted by the bootstrap effect.

The switch circuit CSWn+1 is basically the same circuit as the switch circuit CSWn; however, part of the signals inputted are different. Specifically, while the input node in1 of the switch circuit CSWn receives the signal from the output node o1 of the shift register circuit CSRn, the input node in1 of the switch circuit CSWn+1 receives the signal from the output node o1 of the shift register circuit CSRn+1. Further, while the input node rs2 of the switch circuit CSWn receives the second shift clock signal (CMCK2), the input node rs2 of the switch circuit CSWn+1 receives the first shift clock signal (CMCK1).

The transistors T68 and T69, the input nodes in4 and in5 and the output node "out" among the components of the switch circuit CSWn are included in the switch unit 13SW1, while the other transistors, capacitances and input nodes of the switch circuit CSWn are included in the switch unit 13SW2.

The operation in the touch sensing period (TSP) will be explained below.

First, in response to the input of the high voltage of the start signal (CM_RST) to the transistor T62 via the input node rs1 (reset operation), the switch unit 13SW sets the retention node N23 at the high voltage, resets the node N21 by using the transistor T64, and resets the node N22 by using the transistor T65.

Subsequently, the high voltage of the output node o1 of the shift register unit 13SR is inputted to the input node in1, by which the transistors T59 and T60 are brought into conduction. When the first selection signal (VCOMSEL1) inputted to the input node in2 shifts to the high voltage, the voltage of the node N24 as the gate of the transistor T59 is boosted further by the so-called bootstrap effect of the capacitance C13, the high voltage is outputted to the node 21, the node 22 is boosted as will be explained later, the transistor T68 is brought into conduction, and the AC drive signal (VCOMAC) is outputted to the output node "out". Due to the high voltage outputted to the node 21, the retention node N23 is reset by the transistor T63 and the transistor T69 is blocked.

As shown in FIG. 23, when the first selection signal (VCOMSEL1) shifts to the high voltage first, the node N22 shifts to a high voltage. Subsequently, when the boost control signal (VCOMSELBST) which is inputted to the input node in6 with a phase difference (1) shifts to the high voltage, the node N22 is boosted by the transistor T71 and the capacitance C15 and shifts to a still higher voltage (one-step boost). Subsequently, when the AC drive signal (VCOMAC) which is inputted to the input node in4 with a phase difference (3) shifts to the high voltage, the node N22 is boosted by the bootstrap effect to a yet higher voltage (two-step boost) and outputs the AC drive signal (VCOMAC) to the output node "out". The switch circuit CSWn, capable of performing the boosting in two steps, is compatible with the technological tendency to reduce the voltage of the display panel.

When the AC drive signal (VCOMAC) shifts to the low voltage and the boost control signal (VCOMSELBST) shifts to the low voltage after a phase difference (4), the node N22 is lowered to the voltage of the aforementioned one-step boost. Further, when the first selection signal (VCOMSEL1) shifts to the low voltage after a phase difference (2), the node N22 shifts to the low voltage and the transistor T68 is blocked. The low voltage of the output node o1 of the shift register unit 13SR is inputted to the input node in1, by which the transistors T59 and T60 are blocked.

When the low voltage of the output node o1 of the shift register unit 13SR is inputted to the input node in1, the second shift clock signal (CMCK2) inputted to the input node rs2 shifts to the high voltage. Thus, the retention node N23 is charged by the transistor T61 up to the high voltage, the node N21 is reset by the transistor T64, and the node N22 is reset by the transistor T65. The transistor T69 is brought into conduction by the high voltage of the retention node N23 and the DC drive signal (VCOMDC) is outputted to the output node "out". Meanwhile, the blockage of the transistor T68 is maintained since the node N22 has been reset.

The operation in the write period (PSP) will be explained below.

First, in response to the input of the high voltage of the start signal (CM_RST) to the input node rs1 (reset operation), the switch unit 13SW sets the retention node N23 at the high voltage, resets the node N21 by using the transistor T64, and resets the node N22 by using the transistor T65.

Subsequently, the high voltage of the output node o1 of the shift register unit 13SR is inputted to the input node in1, by which the transistors T59 and T60 are brought into conduction. When the second selection signal (VCOMSEL2) inputted to the input node in3 shifts to the high voltage, the voltage of the node N25 as the gate of the transistor T60 is boosted further by the so-called bootstrap effect of the capacitance C14, the high voltage is outputted to the node 23, the transistor T69 is brought into conduction, and the DC drive signal (VCOMDC) inputted to the input node in5 is outputted to the output node "out". Due to the high voltage outputted to the node 23, the node N21 is reset by the transistor T64 and the node N22 is reset by the transistor T65. Since the node N22 has been reset, the transistor T68 is blocked.

When the low voltage of the output node o1 of the shift register unit 13SR is inputted to the input node in1, the second shift clock signal (CMCK2) shifts to the high voltage. Thus, the retention node N23 is charged by the transistor T61 up to the high voltage, the conduction of the transistor T69 and the blockage of the transistor T68 are maintained, and the DC drive signal (VCOMDC) is outputted to the output node "out".

However, since no first shift clock signal (CMCK1) or second shift clock signal (CMCK2) is inputted in the write period (gate circuit operation period (PSP)) as shown in FIG. 21, the retention node N23 is charged to the high voltage by using the transistor T72 by setting the second control signal (CM_RST2) inputted to the input node rs3 at the high voltage in the write period (PSP). By the high voltage of the retention node N23, the transistor T69 is brought into conduction and the DC drive signal (VCOMDC) is outputted to the common electrode. Incidentally, when the display device operates in the first method, the second control signal (CM_RST2) may be fixed at the low voltage by setting a value in the storage circuit (e.g., register) of the driver IC 5 from the host controller. The transistor T62 may also be left out depending on the circuit configuration.

The leak is prevented by charging the signal node by using the clock signal which is outputted even in the interval between a touch sensing period and the next touch sensing period (i.e., in a write period (PSP)). Since no high retention capacitance has to be added to the signal nodes, the area of the retention capacitance can be reduced, the circuit width can be reduced, and the frame of the display panel can be narrowed. Further, since the common scan circuit can be formed with single-channel thin-film transistors without the need of using complementary thin-film transistors (CMOS devices), the number of steps in the manufacturing process can be reduced and cost reduction can be achieved.

What is claimed is:

1. A display device comprising:
   counter electrodes which are configured to be used as both common electrodes for displaying and scan electrodes for touch sensing;
   a first scan circuit which scans gate lines; and
   a second scan circuit which drives the counter electrodes, wherein:
   the display device is configured so that one frame period includes at least one write period for scanning the gate lines and at least one touch sensing period for scanning the scan electrodes;
   the display device has a first mode in which the write period and the touch sensing period appear alternately multiple times in one frame period and a second mode in which one frame period includes a write period for continuously scanning one screen and a touch sensing period existing between one-screen write period in a current frame and one-screen write period in a next frame;
   the second scan circuit includes a shift register unit and a switch unit;
   the first scan circuit and the second scan circuit include single-channel thin-film transistors;
   a switch unit includes a seventh thin-film transistor which outputs a direct current (DC) drive signal to an output node and an eighth thin-film transistor which outputs an alternating current (AC) drive signal to the output node; and
   a second control signal for fixing voltage of a third retention node to which a gate electrode of the seventh thin-film transistor is connected, the second control signal is inputted in the one-screen write period both in the current frame and the next frame of the second mode,
   the switch unit includes a tenth thin-film transistor for boosting voltage of a first node, to which a gate electrode of the eighth thin-film transistor is connected, according to a first selection signal, and
   the switch unit includes an eleventh thin-film transistor for further boosting the voltage of the first node according to a boost control signal.

2. The display device according to claim 1, wherein the switch unit includes a ninth thin-film transistor for charging the third retention node according to the second control signal.

3. The display device according to claim 2, wherein the switch unit includes retention capacitance which is connected to the third retention node.

4. The display device according to claim 1, wherein the first scan circuit is arranged between the shift register unit and the switch unit in a plan view.

5. The display device according to claim 1, further comprising sensing electrodes for the touch sensing.

6. A display device comprising:
an array substrate including
counter electrodes which are configured to be used as both common electrodes for displaying and scan electrodes for touch sensing,
a first scan circuit which scans gate lines, and
a second scan circuit which scans the counter electrodes;
a counter substrate; and
a control circuit, wherein:
the display device is configured so that one frame period includes a write period for continuously scanning one screen and a touch sensing period existing between a write period in a current frame and a write period in a next frame;
the first scan circuit scans the gate lines in the write period both in the current frame and the next frame;
the second scan circuit scans the scan electrodes in the touch sensing period;
the second scan circuit includes a shift register unit and a switch unit;
the first scan circuit and the second scan circuit include single-channel thin-film transistors;
the switch unit includes a seventh thin-film transistor which outputs a direct current (DC) drive signal to an output node and an eighth thin-film transistor which outputs an alternating current (AC) drive signal to the output node;
a second control signal for fixing voltage of a third retention node to which a gate electrode of the seventh thin-film transistor is connected, the second control signal is inputted in the write period both in the current frame and the next frame,
the switch unit includes a tenth thin-film transistor for boosting voltage of a first node, to which a gate electrode of the eighth thin-film transistor is connected, according to a first selection signal, and
the switch unit includes an eleventh thin-film transistor for further boosting the voltage of the first node according to a boost control signal.

7. The display device according to claim 6, wherein the switch unit includes a ninth thin-film transistor for charging the third retention node according to the second control signal.

8. The display device according to claim 7, wherein the switch unit includes retention capacitance which is connected to the third retention node.

9. The display device according to claim 6, wherein the display device is configured to be able to operate in a mode in which a write period and a touch sensing period appear alternately multiple times in one frame period.

10. The display device according to claim 6, wherein the first scan circuit is arranged between the shift register unit and the switch unit in a plan view.

11. The display device according to claim 6, wherein the counter substrate includes sensing electrodes for the touch sensing.

* * * * *